United States Patent [19]

Yagi et al.

[11] Patent Number: 4,846,128

[45] Date of Patent: Jul. 11, 1989

[54] IGNITION TIMING CONTROL SYSTEM FOR INTERNAL COMBUSTION ENGINE

[75] Inventors: Shizuo Yagi, Asaka; Yoshiaki Hirosawa, Shiki; Makoto Kawai, Tokorozawa; Yorihisa Yamamoto, Shiki; Haruhiko Yoshikawa, Niiza; Kenichi Nakamura, Fujimi, all of Japan

[73] Assignee: Honda Giken Kogyo Kabushiki Kaisha, Tokyo, Japan

[21] Appl. No.: 868,593

[22] Filed: May 30, 1986

[30] Foreign Application Priority Data

| May 30, 1985 | [JP] | Japan | 60-117231 |
| Aug. 9, 1985 | [JP] | Japan | 60-175182 |
| Sep. 25, 1985 | [JP] | Japan | 60-211963 |

[51] Int. Cl.$^4$ ............................................. F02P 5/145
[52] U.S. Cl. ............................................. 123/425
[58] Field of Search ............................. 123/425, 435

[56] References Cited

U.S. PATENT DOCUMENTS

| 3,957,023 | 5/1976 | Peterson | 123/425 |
| 4,190,027 | 2/1980 | Inui et al. | 123/416 |
| 4,211,194 | 7/1980 | Hattori et al. | 123/417 |
| 4,328,779 | 5/1982 | Hattori et al. | 123/416 |
| 4,397,285 | 8/1983 | O'Neill | 123/502 |
| 4,406,265 | 9/1983 | Brandt et al. | 123/425 |
| 4,417,556 | 11/1983 | Latsch | 123/425 |
| 4,466,408 | 8/1984 | Cheklich | 123/425 |
| 4,481,925 | 11/1984 | Karau et al. | 123/425 |
| 4,679,536 | 7/1987 | Morita | 123/425 |

FOREIGN PATENT DOCUMENTS

| 53-27710 | 3/1978 | Japan | 123/425 |
| 57-113344 | 7/1982 | Japan | 123/425 |
| 58-195068 | 11/1983 | Japan | 123/425 |

*Primary Examiner*—Andrew M. Dolinar
*Attorney, Agent, or Firm*—Birch, Stewart, Kolasch & Birch

[57] ABSTRACT

An ignition timing control system for an internal combustion engine which controls the ignition timing for one engine cycle in response to the maximum peak position datum of the indicative pressure signal representing the inner pressure within the combustion chamber during the preceding engine cycle. A misfire detecting means is provided which produces a misfire detection signal upon incomplete combustion in the combustion chamber in an engine cycle. The maximum peak position datum is neglected during the engine cycle in which the misfire detection signal appears. At least one pressure sensor is provided for one cylinder in a group of the cylinders having generally the same charging efficiency or volumetric efficiency.

6 Claims, 23 Drawing Sheets

IGNITION TIMING CONTROL SYSTEM FOR INTERNAL COMBUSTION ENGINE

FIELD OF THE INVENTION

The present invention relates to an ignition timing control system for an internal combustion engine and, in particular, to an ignition timing control system for controlling the timing ignition timing of an internal combustion engine so as to cause the maximum pressure within the combustion chamber due to combustion to occur during an optimum crank angle region.

BACKGROUND OF THE INVENTION

It is possible to obtain a so-called indicative pressure signal representative of the inner pressure of the combustion chamber of an internal combustion engine by providing a pressure sensor such as a piezo-electric element in a bore formed through a member forming the combustion chamber of the engine such as a cylinder head. A pressure gauge may be otherwise interposed between the cylinder head and the cylinder block of the engine, which functions as the pressure sensor for producing the indicative pressure signal.

It will be seen that the internal pressure in the combustion chamber under operation of the engine changes as indicated by a curve A in FIG. 1. When the ignition system of the engine is triggered at an ignition angle $\theta IG$, the air-fuel mixture supplied thereto starts firing with a time delay of $\theta d$ and, subsequently, the internal pressure rapidly increases up to a maximum pressure peak (referred to as an indiative pressure peak hereinafter) and then decreases.

It is known that a crank angle position of the indicative pressure peak has a certain relationship with the state of the engine at which the maximum output is produced, and the indicative pressure peak giving the maximum engine output has been found, by experiment, to be located between 12 to 13 degrees after the top dead center (referred to as ATDC hereinafter) as shown in the drawings. Therefore, ATDC 12 to 13 degrees may be considered as an ideal crank angle region. It is therefore desirable to determine the ignition timing $\theta IG$ so that the indicative pressure peak crank angle falls within the ideal crank angle region which is ATDC 12 to 13 degrees.

Even if, however, the ignition timing $\theta IG$ is determined, the indicative pressure peak varies from time to time depending on the operating conditions of the engine and, therefore, an ignition timing control device is desired which can keep the indicative pressure peak occurring within the optimum crank angle.

A feed-back ignition timing control system is disclosed in U.S. Pat. No. 4,481,925 issued Nov. 13, 1984. The feed-back ignition timing control system controls the ignition timing of an internal combustion engine in response to the indicative pressure peak signal to keep the indicative pressure peak crank angle position within an optimum region. In this prior art system, contamination of the indicative pressure signal by high frequency noises is ignored by providing a gating function for taking the indicative peak information only during a predetermined crank angle region or zone. The particular crank angle zone is defined by timing pulses generated by a pulse generator including a toothed wheel and a pickup for producing a timing pulse at each time of the passage of the teeth before it. The teeth are mounted on the periphery of the wheel equidistantly such as 60 degrees.

However, it has been a problem that such gating function defined by the timing pulses cannot suffice required freedom in view of wide applications to various types of engines. In some cases, it has been required to more precisely define the crank angle zone so as to avoid influence by any possible noises in the indicative pressure signal and to obtain a sufficient calculation period for the desired ignition timing for the succeeding engine cycle.

As furthermore, being well known in the art, the internal combustion engine is subject to unusual or incomplete combustion such as misfiring thereby causing that the indicative pressure signal has a waveform deformed from the typical one. Such deformed waveform of the indicative signal is inappropriate for the basis for the feed-back control of the ignition timing.

SUMMARY OF THE INVENTION

It is therefore a primary object of the present invention to provide an improved ignition timing control system for an internal combustion engine in response to the indicative pressure signal, which can correctly operate notwithstanding occurrences of incomplete combustion in the engine.

It is another object of the present invention to provide an improved ignition timing control system for a multi-cylinder internal combustion engine in response to the indicative pressure signal picked up from one or more of the power cylinders, which is economical.

Further objects and advantages of the present invention will be apparent from the following description and the accompanying drawings.

DETAILED DESCRIPTION OF EMBODIMENTS

Figure 2:
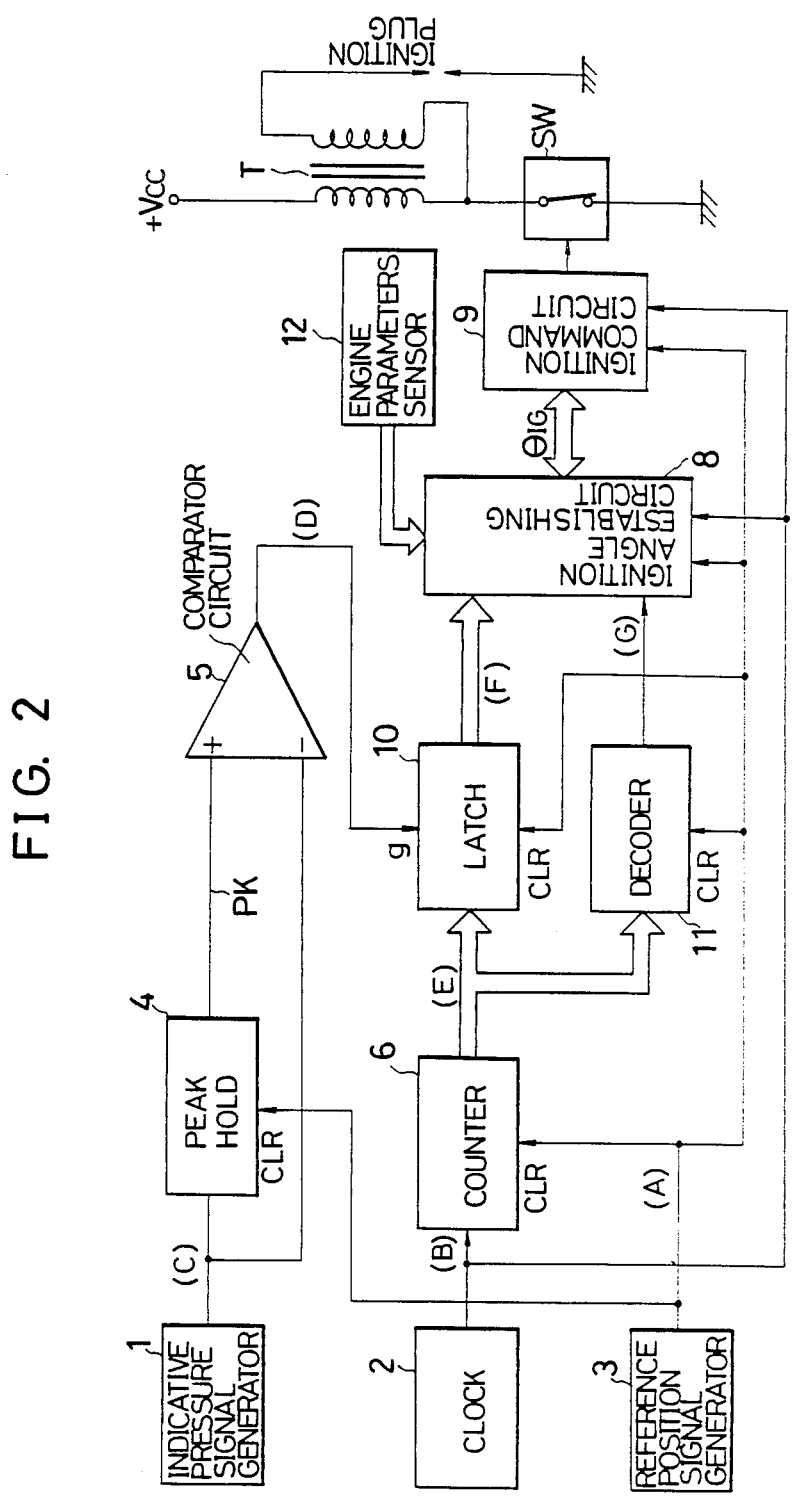
FIG. 2 is a circuit diagram showing an embodiment of the present invention.

FIG. 2 shows an ignition timing control system according to the present invention, and this system comprises an indicative pressure signal generating circuit 1 which generates an indicative pressure signal by using pressure sensor which may include a piezo-electric element and is inserted into a bore provided through a member such as a cylinder head which defines a combustion chamber of an internal combustion engine in such a manner that the detection head of the pressure sensor is exposed to the interior of the combustion chamber. A clock generating circuit 2 produces clock pulses appearing in synchronism with the rotation of the engine. Means for obtaining clock pulses which are in synchronism with the rotation of the engine may consist of a disc which rotates in synchronism with the engine and has a plurality of slits in combination with a photo-coupler in such a manner that the clock pulses may be obtained from the output signal of the photo-coupler. A reference position generating circuit 3 produces a reference position signal, for example a TDC (Top Dead Center) pulse, which indicates that the crank angle position or the engine rotational angle position has reached a reference position. The TDC pulse may be obtained by providing a separate slit for TDC pulses in the disc which is already provided with the slits used for the clock generating circuit 2, in combination with a photocoupler for generating TDC pulses. A peak hold circuit 4 holds the maximum value of the indicative pressure signal after it is cleared by the reference position signal. A comparator circuit 5 produces a peak detection signal when the indicative pressure signal has fallen below its maximum value kept by the peak hold circuit 4. A counter 6 for measuring the crank angle position counts the number of the clock pulses and is reset by the reference position signal. The count value of the counter 6 which may be 8-bit data indicates the current value of the crank angle. A latch circuit 10 latches the count value of the counter 6 every time the peak detection signal from the comparison circuit 5 is supplied to the gate terminal g of the latch circuit 10, while a decoder 11 supplies a read-in command signal to an ignition angle establishing circuit 8 when the count value of the counter 6 reaches a predetermined value, for instance "63". The count value of "63" corresponds to a crank angle which is greater than any crank angle at which the indicative pressure peak is expected to occur, and the read-in timing is so selected that it will not be interfered by noises such as the combustion noises and the valve seating noises caused by the operation of the inlet and/or exhaust valves. The ignition angle establishing circuit 8 accordingly reads out or takes the contents of the latch circuit 10 and determines the indicative pressure peak position datum $\theta_{px}$ from the contents of the latch circuit 10. It is also possible to use a structure according to which the contents of the latch circuit 10 are supplied to the ignition timing establishing circuit 8 by way of a gate circuit which opens its gate by a read-in command signal from the decoder 11. The ignition angle establishing circuit 8 may consist of a microprocessor and supplies a desired ignition angle $\theta_{IG}$ ignition command circuit 9 according to a program, which is described hereinafter, and the peak position information (data) supplied thereto. The ignition command circuit 9 detects the current value of the crank angle $\theta_{ig}$ by counting the clock pulses and using the reference position signal as a reference, and closes an ignition switch SW when the current crank $\theta_{ig}$ and the input $\theta_{IG}$ coincide with each other, whereby ignition current is passed through the primary winding of an ignition transformer T and a spark ignition takes place at an ignition plug. Accordingly, the desired ignition angle $\theta_{IG}$ is a next-cycle ignition angle datum for governing the actual ignition during the next engine cycle succeeding to the engine cycle having caused the appearance of the indicative pressure peak $\theta_{px}$ the ignition angle establishing circuit 8 and the ignition command circuit 9 form the ignition command means. The ignition angle establishing circuit 8 may be equipped with a mode in which the ignition angle establishing circuit 8 operates according to various parameters such a rotational speed of the engine Ne, intake negative pressure $P_B$, throttle opening $\theta_{th}$ and so on, obtained from engine parameter sensors 12.

Figure 3:
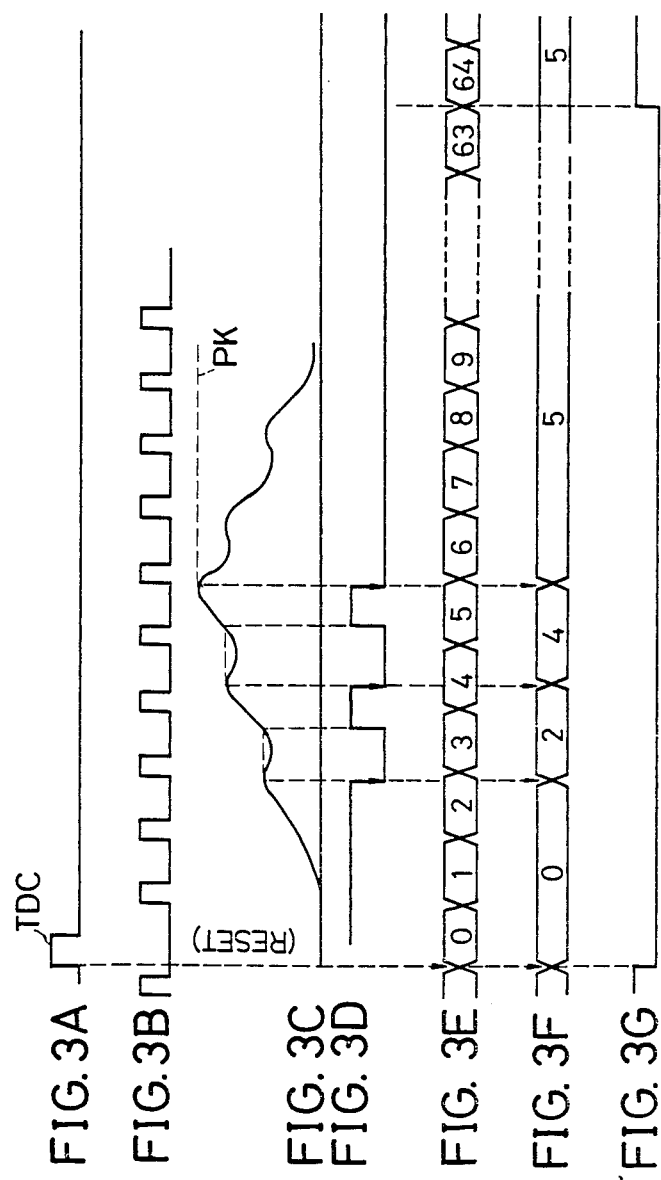
FIGS. 3A through 3G are diagrams illustrating waveforms of signals appearing in the circuit of FIG. 2.

FIGS. 3A to 3F show signal waveforms for illustrating the actions of the above-described circuits. Specifically, the reference position signal and the clock pulses appear as shown in FIGS. 3A and 3B, respectively. The indicative pressure signal changes in such a manner as shown by a solid line in FIG. 3C and the output of the peak hold circuit 4 therefore changes in such a manner as shown by the dotted line in FIG. 3C. The comparator circuit 5 produces a peak detection pulse signal upon detection of every local maximum of the indicative pressure signal as shown in FIG. 3D. FIG. 3E shows the changes of the count values of the counter 6 in decimals.

FIG. 3F shows the contents of the latch circuit 10 in decimals. FIG. 3G shows the changes in the output of the decoder 11 and, in this case, a higher level corresponds to the read-in command signal.

Figure 4:
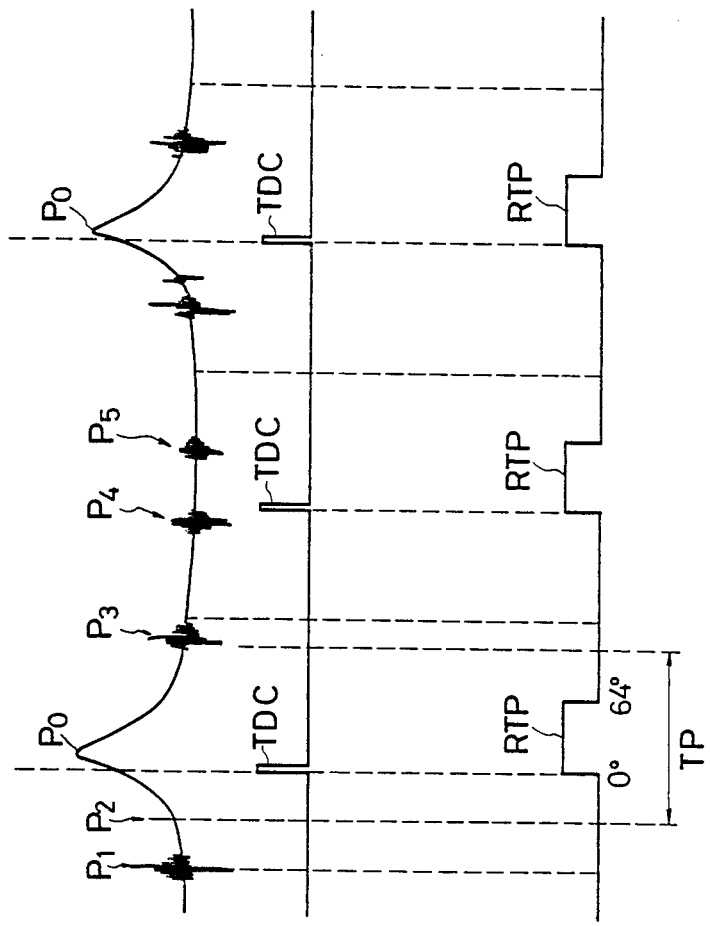
FIG. 4A is a diagram showing a waveform of the indicative pressure signal.
FIG. 4B is a diagram showing a waveform of TDC pulses.
FIG. 4C is a diagram showing gate timings for receiving the indicative pressure peak data.

FIG. 4A shows an example of waveform of the indicative pressure signal which contains maximum peak values $P_O$, valve seating noises $P_1$, $P_2$, $P_4$ and $P_5$, and an ignition noise $P_2$. FIG. 4B shows waveforms of the reference position pulses each appearing at the TDC. FIG. 4C shows that the ignition timing control system restricts the time period for picking up the maximum peak position information to a short time period RTP (0 degree to 64 degree), that is , from the TDC to the predetermined crank angle corresponding the decoding number of, in this embodiment, 63. The short time period RTP is contained within the time period from the ignition timing to the valve seating timing, so that the operation for picking up the maximum peak position information is not adversely affected by the ignition noises and valve seating noises etc.

Figure 1:
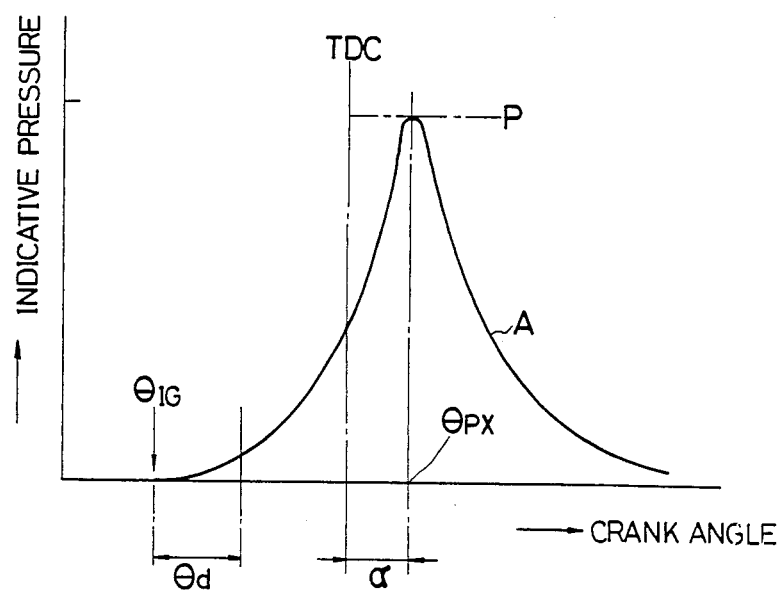
FIG. 1 is a graph showing the changes in the internal pressure of an engine cylinder.
Figure 5:
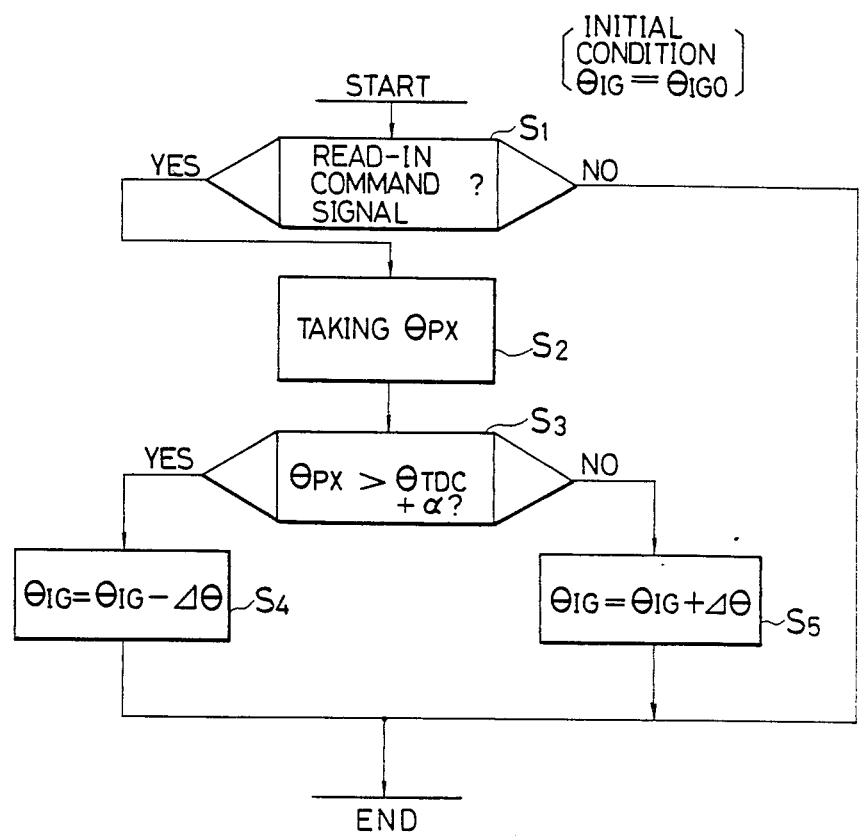
FIGS. 5 and 6 are flow charts describing basic action programs of the parts of the device of FIG. 2 made of a micro computer.

FIG. 5 shows an example of the program governing the ignition control operation of the ignition angle establishing circuit 8 of the system shown in FIG. 1 when the circuit 8 is made of a microprocessor In performing the ignition control action, the ignition angle establishing circuit 8 initially establishes or determines the ignition angle $\theta_{IG}$ at an initial value $\theta_{IGO}$ and waits for the read-in command signal from the decoder 11, and, upon receipt of the read-in command signal, takes therein the latch contents of the latch circuit 10 as the peak position information $\theta_{px}$ (steps $S_1$ and $S_2$). Then, it is distinguished if the peak position information $\Theta_{px}$ is greater than the sum of the top dead center angle $\theta_{TDC}$ and a certain angle $\alpha$, for instance 12 degrees, or not (step $S_3$). If $\theta_{px} > \theta_{TDC} + \alpha$, then the ignition angle $\theta_{IG}$ is advanced by $\Delta\theta$(step $S_4$) and, if not, the ignition angle $\theta_{IG}$ is delayed by $\Delta\theta$(step $S_5$). These actions from start to end, steps $S_1$ to $S_5$, are sequentially executed and cyclically repeated. This is the case with other programs which are referred to hereinafter.

Figure 6:
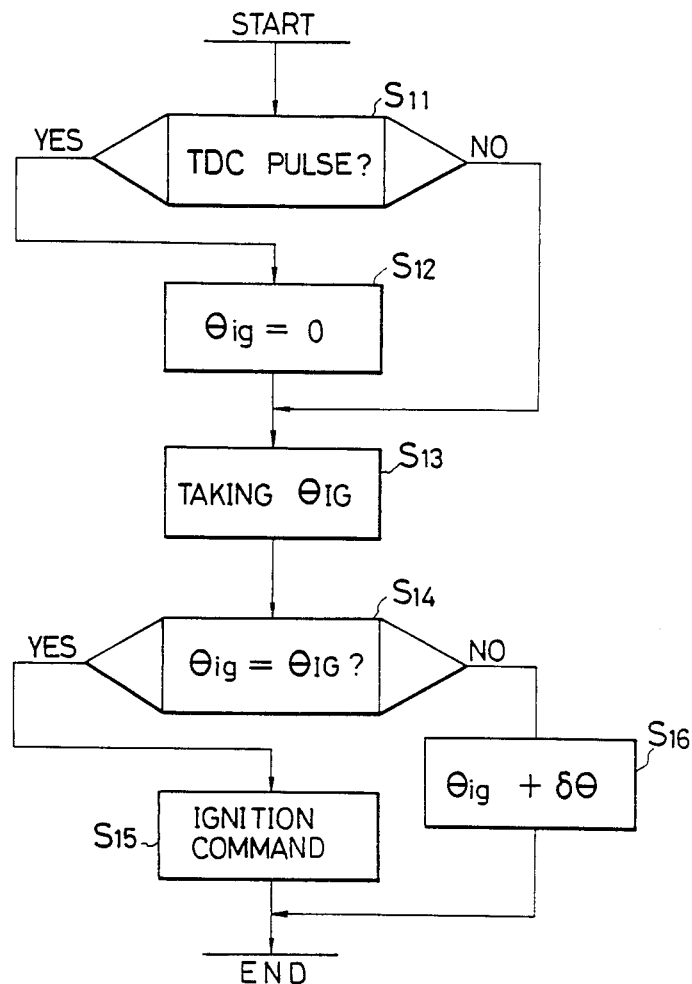

FIG. 6 shows an example of the action program of the ignition command circuit 9 when it is made of a microprocessor. When the ignition command circuit 9 detects the reference position signal (step $S_{11}$), the present value of the crank angle $\theta_{ig}$ is set to $\theta_{TDC}$ (or a predetermined value) (step $S_{12}$). Then, the ignition angle data $\theta_{IG}$ from the ignition angle establishing circuit 8 is taken in (in step $S_{12}$) and this data is compared with the present value of the crank angle $\theta_{ig}$. If the relationship $\theta_{ig} = \theta_{IG}$ holds, the ignition command is issued (steps $S_{14}$ and $S_{15}$) and the ignition switch SW is closed. On the other hand, if $\theta_{ig} \neq \theta_{IG}$ holds, a unit angle$\delta\theta$ is added to the $\theta_{ig}$ (step $S_{16}$) and the program flow stands by for the next program cycle. It is also possible to determine whether the difference between the $\theta_{ig}$ and $\theta_{IG}$ is greater or smaller than $\delta\theta$, in step $S_{14}$, instead of determining whether $\theta_{ig} = \theta_{IG}$ holds or not.

In the above-described embodiment, the peak position data $\theta_{px}$ was obtained in every engine cycle and the ignition angle for the next engine cycle is determined on the basis of the $\theta_{px}$ of the current engine cycle.

Figure 7:
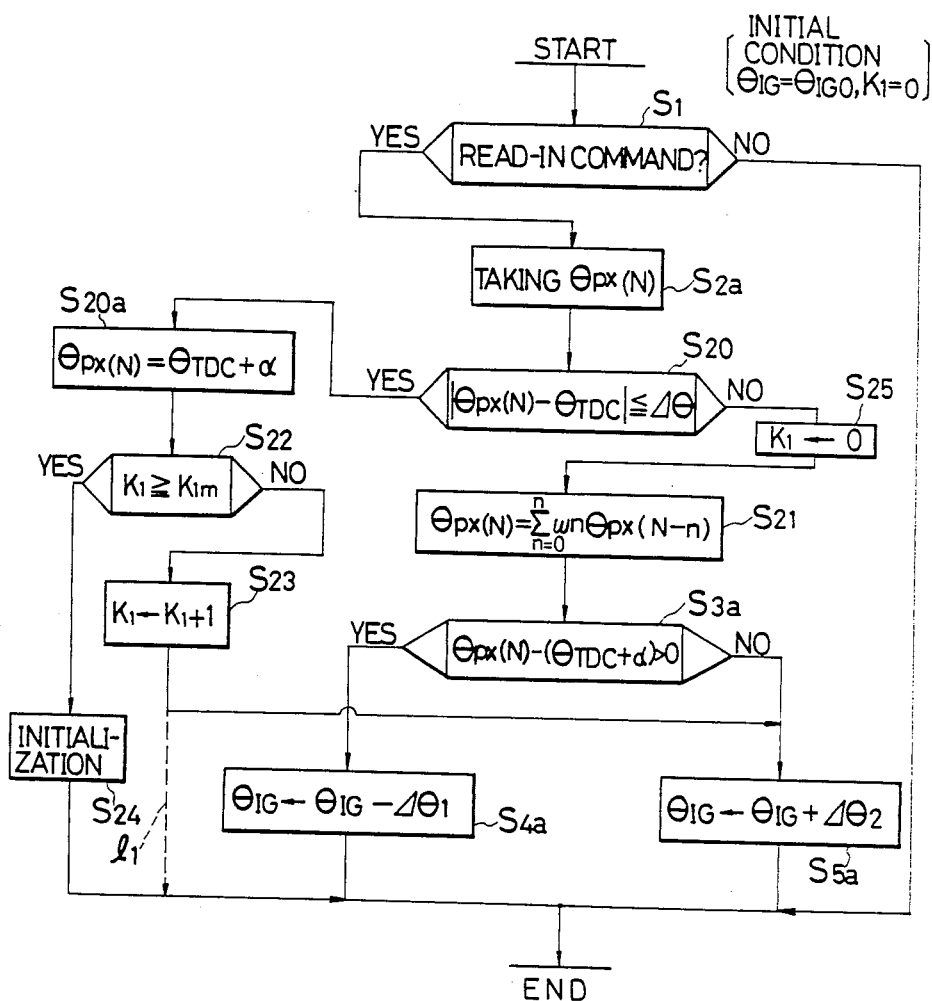
FIGS. 7 through 11 and 13 are flow charts describing action modes of a part of FIG. 2, which are respectively modified from that of FIG. 5.

FIG. 7 shows another example of the action program for the ignition angle establishing circuit 8 in the ignition timing control device according to the present invention. In this program, the basic flow is not different from that of the program of the flow chart given in FIG. 5 that is the indicative pressure peak data $\theta_{px}$ is taken in by the circuit 8 while the read-in command signal from the decoder 11 is present (steps $S_1$ and $S_{2a}$) and the ignition angle is delayed or advanced in dependence on the difference between the $\theta_{px}$ and $(\theta_{TDC} + \alpha)$ (steps $S_{3a}$, $S_{4a}$ and $S_{5a}$).

However, according to this embodiment, $\theta_{px}$ is grasped as a group of data which are generated in the sequence and the indicative pressure peak position data obtained in the N-th engine cycle is expressed as $\theta_{px}(N)$ (step $S_{2a}$)

When an engine misfire occurs, combustion will not take place in the cylinder and the indicative pressure peak arises in the vicinity of $\theta_{TDC}$. Since, furthermore, the indicative pressure peak position data obtained in the engine cycle involving a misfire is not based on normal combustion, it is not appropriate to be used as a basis for the indicative pressure peak position control of the subsequent engine cycle. Therefore, $\theta_{px}(N)$ and $\theta_{TDC}$ are compared in advance and the arithmetic operation or $\theta_{px}(N)$ is performed only when the difference thereof is greater than $\Delta\theta$(steps $S_{20}$ and $S_{21}$). In this arithmetic operation step $S_{21}$, the current data value is corrected by the preceding indicative pressure peak position data values in the (N-1)-th, (N-2)-th, . . . , (N-n)-th engine cycles according to the following formula to enhance the stability of the feedback system.

$$\theta_{px}(N) = \sum_{n=0}^{n} \omega_n \theta_{px}(N-n)$$

As a concrete example, the current data may be derived from the average value of the four preceding data and the current data by setting $\omega_0 = \omega_1 = \omega_2 = \omega_3 = \omega_4 = 1/5$ and $\omega_5 = \omega_6 = \ldots = \omega_n = 0$. The averaging method is not limited by this, but may be based on averaging of an arbitrary number of data. And, it is also possible to set $\omega_n = (1/L)^n$ (where $L > 1$ and $n > 0$).

The ignition angle advance and delay control may be made according to the thus derived results of comparison between $\theta_{px}$ and $(\theta_{TDC} + \alpha)$ (steps $S_{4a}$ and $S_{5a}$), but the angle advance $\Delta\theta_1$ and the angle delay $\Delta\theta_2$ need not be equal to each other but it may be that either $\Delta\theta_1 > \Delta\theta_2$ or $\Delta\theta_1 < \Delta\theta_2$ depend on the characteristics of the feedback system. Further, $\Delta\theta_1$ and $\Delta\theta_2$ may be functions of the difference between $\theta_{px}$ and $(\theta_{TDC} + \alpha)$.

When the difference between $\theta_{px}$ and $\theta_{TDC}$ is equal to or less than $\theta_{px}(N)$ is made equal to $\theta_{TDC} + \alpha$(step $S_{20a}$). As long as $K_1 < K_{1m}$ (step $S_{22}$), $K_1$ is set to equal to $K_1 + 1$ and an ignition angle delay control is conducted, and, if $K_1 \geq K_{1m}$ by consecutive occurrence of misfires, and initialization step is conducted for resetting the ignition timing (step $S_{24}$). If $|\theta_{px} - \theta TDC| > \Delta\theta$, then $K_1$ is set to zero and the program flow advances to the next step (step $S_{25}$). It is also possible not to conduct the ignition angle delay control when the engine misfire occurs and let the program flow advance to the next program cycle as indicated by the broken line $l_1$. It is also possible to ignore the exhaust stroke of the engine when this ignition timing control device is applied to a four-stroke engine. When it is the case, the exhaust stroke detection sensor may be omitted.

Figure 8:
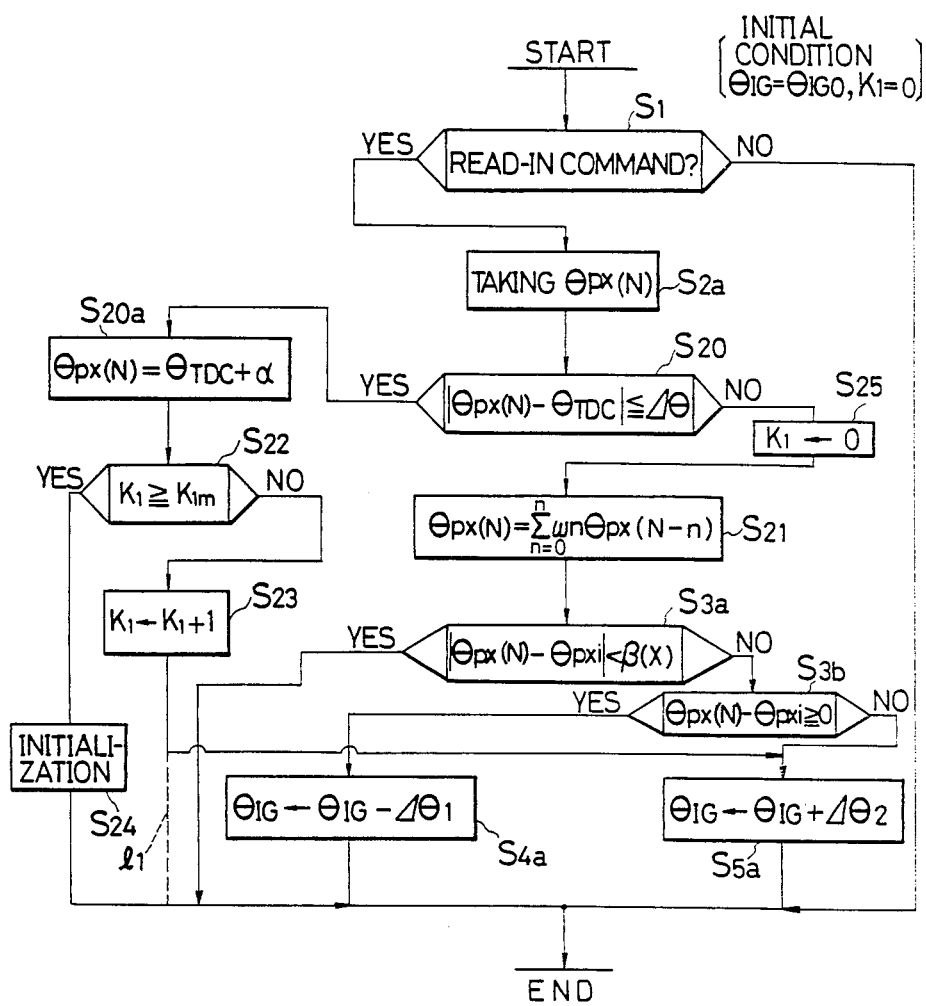

FIG. 8 shows still another example of the action program for the ignition angle establishing circuit 8. In this program, the control target value $\theta_{pxi}$ is not set to the single angle $(\theta_{TDC} + \alpha)$ but set to a control target zone $\theta_{pxi} \pm \beta(x)$. Thereby, the stability of the feedback system may be improved. The parameter x of $\beta(x)$ may be either one of engine rotational speed Ne, throttle opening $\theta_{TH}$ and engine intake manifold vacuum $P_B$. It is also possible to vary the value of $\beta$ using a combination of these parameters as a variable. Otherwise, this program is similar to that of FIG. 6. Further, it is also possible to set $\beta(x)$ as a constant $\beta$.

Figure 9:
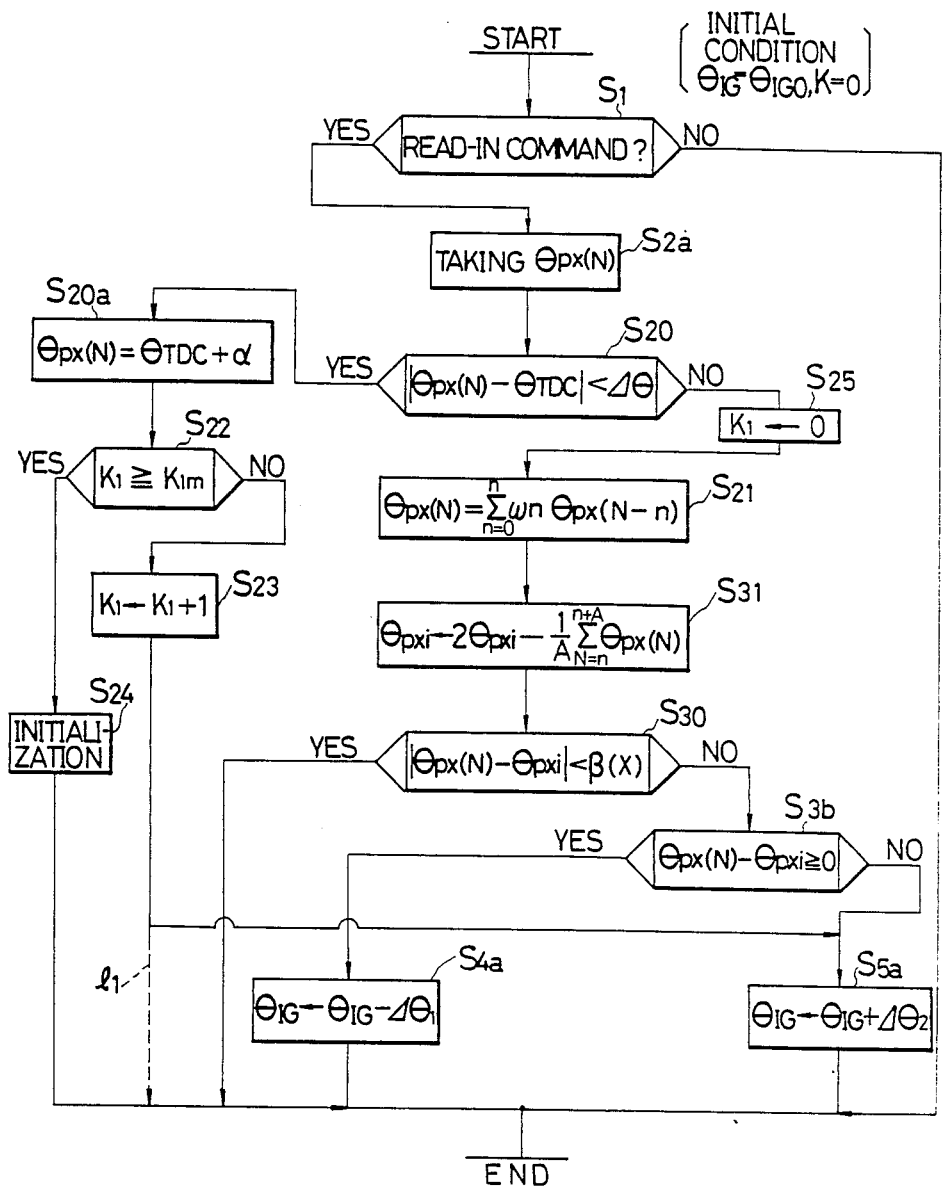

FIG. 9 shows another example of the action program performed by the ignition angle establishing circuit 8. In this program, the control target value $\theta_{pxi}$ for $\theta_{px}(N)$ is not fixed but the difference between $\theta_{pxi}$ and the average value of $$\theta_{px}(N) \left( = \frac{1}{A} \sum_{N=A}^{n+A} \theta_{px}(N) \right)$$

is taken into consideration for deriving $\theta_{pxi}$ to obtain a new $\theta_{pxi}$ which is equal to $(2\theta_{pxi} - \theta_{px}(N))$. This program is the same as the program given in the flow chart of FIG. 8 except the above mentioned point.

Figure 10:
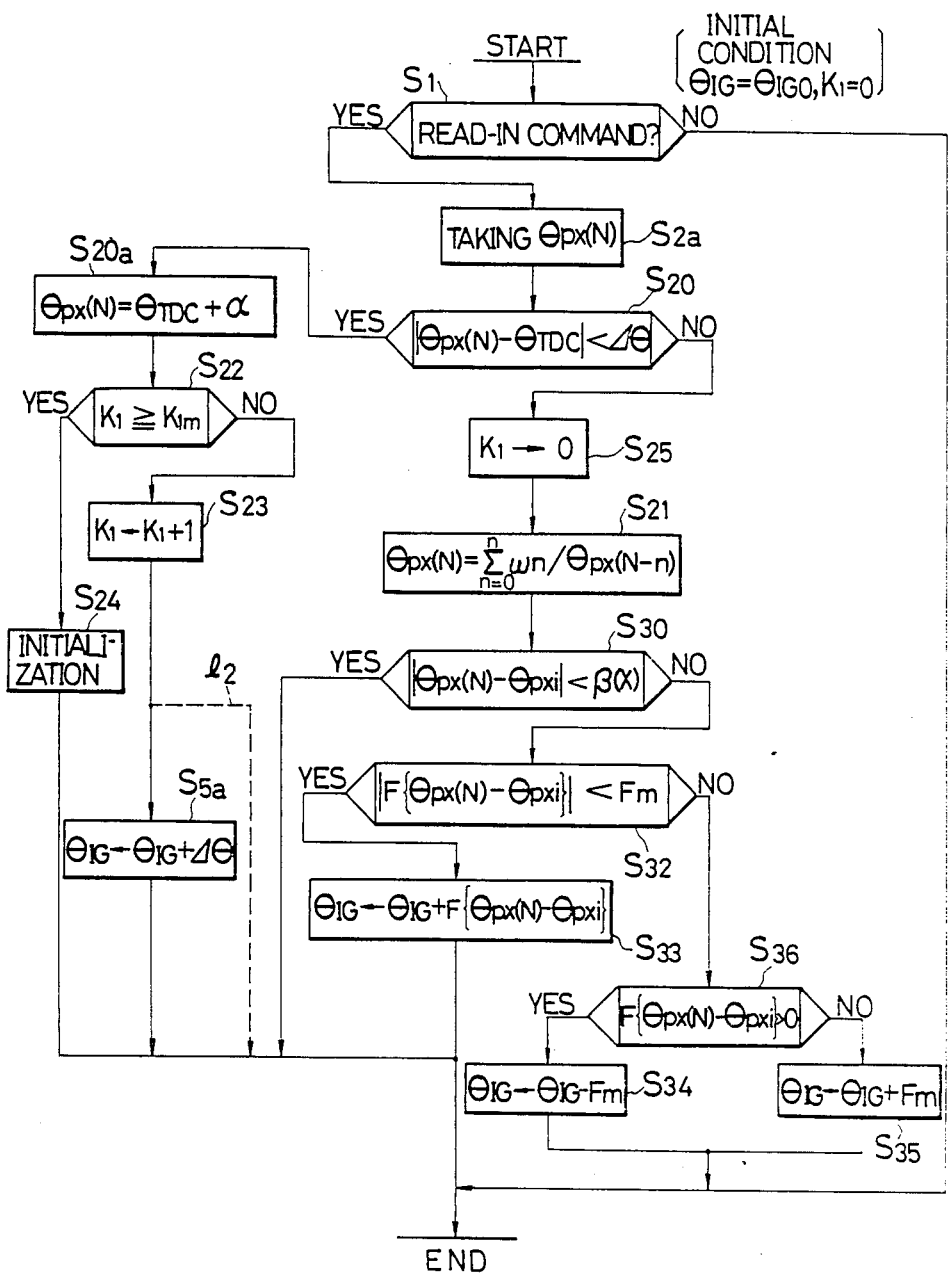

FIG. 10 shows another example of the action program to be performed by the ignition angle establishing circuit 8. This program is the same as the program of FIG. 7 in that the control target value $\theta_{pxi}$ for $\theta_{px}(N)$ is determined as a control target zone $\theta_{pxi} \pm \beta(x)$ instead of a single angle. However, the correction of $\theta_{IG}$ is given by an odd function $F[\theta_{px}(N) - \theta_{pxi}]$ having the deviation of $\theta_{px}(N)$ from $\theta_{pxi}$, or $[\theta_{px}(N) - \theta_{pxi}]$, as a variable (step $S_{33}$). This odd function F(Z) may be an odd function having a single inflection point which may be expressed in the general form of $(Z-\gamma)^n$ such as Z, $Z^3$, $Z^5$, .... In particular, when $n \geq 3$, the feedback is rapidly increased as the deviation of $\theta_{px}(N)$ from the target value $\theta_{pxi}$ increases and a brisk feedback control may be expected On the other hand since the possibility of producing a hunting may arise in the feedback system when the feedback is excessive, the maximum feedback is limited. The above-described acions are conducted in the steps $S_{32}$, $S_{34}$ and $S_{35}$ of the flow chart of FIG. 9.

In this case, the step $S_{5a}$ which delays the ignition timing by $O_2$ may be either conserved or omitted, as it is indicated by a broken line $l_2$.

Figure 11:
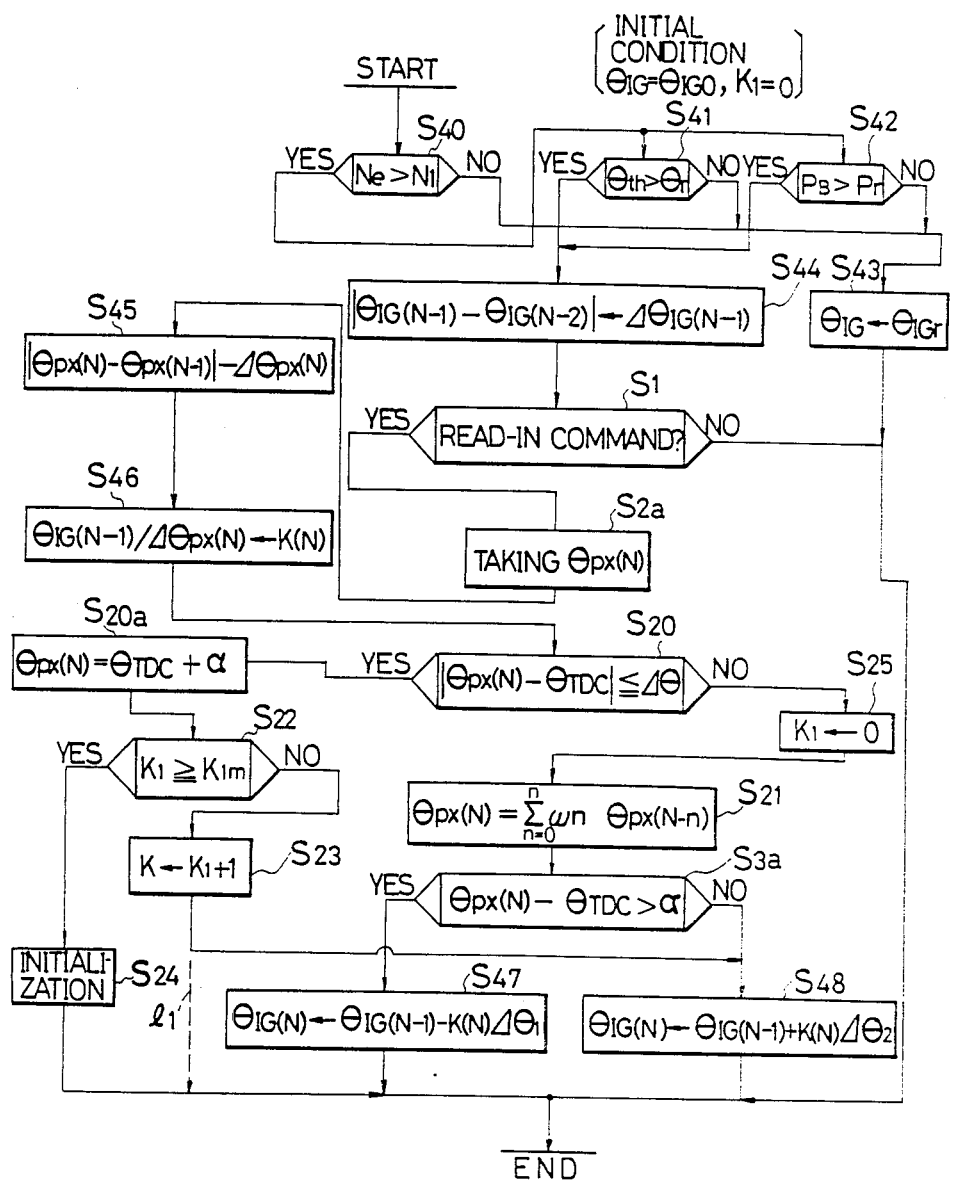
Figure 12:
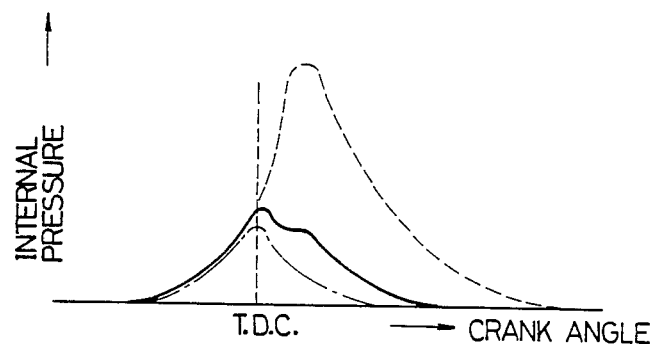
FIG. 12 is a graph showing that the indicative pressure change curve is dependent on the engine operating condition.

FIG. 11 shows yet another example of the action program of the ignition angle establishing circuit 8. Specifically, in this program, rotational speed of the engine Ne, throttle opening $\theta_{th}$, an intake manifold vacuum $P_B$ among various engine parameters are compared with reference values Nr, $\theta r$ and Pr, respectively, and the ignition angle $\theta_{IG}$ is fixed to $\theta_{IGr}$ insofar as they do not exceed their reference values (steps $S_{40}$, $S_{41}$, $S_{42}$ and $S_{43}$). The reference ignition angle $\theta_{IGr}$ may be varied in accordance with either engine parameters such as engine rotational speed and so on or a value selected from a map based on engine parameters. When either one of Ne, $\theta_{th}$ an $P_B$ has exceeded Nr, $\theta r$ and Pr, respectively, the feedback action is to take place. The reason why the switch over between the determination of the ignition angle $\theta_{IG}$ based on feedback control on the basis of various engine parameters and the use of the fixed $_{IG}$ is made here is, the indicative pressure near the top dead center due only to the compression of air may be greater than the indicative pressure near the top dead center due to the combustion in the cylinder. When the engine rotational speed is low, the changes in the indicative pressure in such a case are shown by the chain-dot line in FIG. 12. When the throttle opening is small or the intake negative pressure is great, the engine load is small or the throttle opening is extremely small, the indicative pressure changes in such a manner as shown by a solid line curve in FIG. 12. In this case also, the peak position of the maximum indicative pressure peak is located near the top dead center and it is not suitable to feedback control the ignition angle. The dotted line curve in FIG. 12 shows the changes of the indicative pressure under normal operation condition. It is now to be understood that either step $S_{41}$ or $S_{42}$ may be omitted, if preferred.

When it is detected that the engine is under normal operation condition or, in other words, is not in the state of low engine rotational speed, the state of extremely small throttle opening or the state of low engine load condition, it can be done to take the indicative pressure peak position $\theta_{px}(N)$. However, in this program, the difference $\Delta\delta_{IG}(N-1)$ between the ignition angle $\theta_{IG}(N-1)$ which was set up in the previous program cycle and the ignition angle $\theta_{IG}(N-2)$ which was set up in the yet previous program cycle is first compured (step $S_{45}$). Then, upon detection of the presence of the read-in command signal, the indicative pressure peak data $\theta_{px}(N)$ is taken in (steps $S_1$ or $S_{2a}$). Thereafter, the contents of the step $S_{44}$ may be executed.

Then, the difference $\Delta\theta_{px}(N)$ between the present $\theta_{px}(N)$ and the preceding $\theta_{px}(N-1)$ is computed (step $S_{45}$), and the ratio K(N) of $\Delta\theta_{px}(N)$ to the already obtained $\Delta\theta_{IG}(N-1)$ is derived in the step $S_{46}$. Thereafter, the steps $S_{20}$, $S_{21}$, $S_{22}$, $S_{23}$, $S_{24}$, $S_{25}$ and $S_{3a}$ are executed in the same way as described in connection with FIG. 7.

In thus advancing or delaying the previous ignition angle $\theta_{IG}(N-1)$ according to the peak position of $\theta_{px}(N)$, $\theta_{IG}(N-1)$ is either decreased or increased by $K(N)\cdot\Delta\theta_1$ or $K(N)\cdot\Delta\theta_2$ (steps $S_{47}$ and $S_{48}$).

It means that, since the current peak position $\theta_{px}(N)$ is based on the ignition angle $\theta_{IG}(N-1)$ computed during the preceding cycle and the previous peak position is based on the yet previous ignition angle $\theta_{IG}(N-2)$, the degree of influence of the change $\Delta\theta_{IG}(N-1)$ from $\theta_{IG}(N-2)$ to $\theta_{IG}(N-1)$ on the change $\Delta\theta_{px}(N)$ from $\theta_{px}(N-1)$ to $\theta_{px}(N)$ is represented by K(N) and it is reflected in the angle advance or delay control of the currently established ignition angle $\theta_{IG}(N)$ for the ignition of the next engine cycle.

Figure 13:
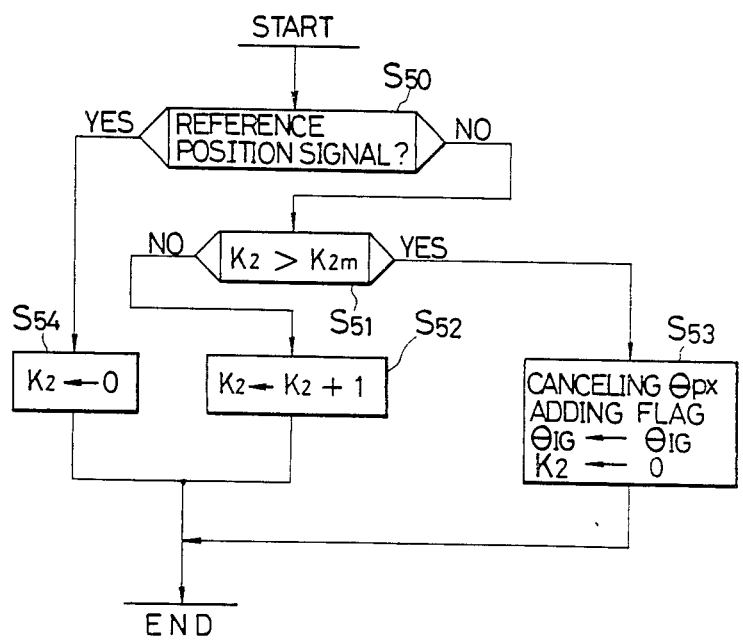

FIG. 13 shows a subroutine program which is effective for use in the ignition angle establishing circuit 8.

The ignition angle establishing circuit containing this subroutine program determines whether the reference position signal such as the TDC pulse is present or not (step $S_{50}$). If not, it is determined whether the time interval of the absence of the reference position signal has exceeded ($K_{2m} \times$ clock period) or not (step $S_{51}$). If not, 1 is added to the constant $K_2$ and the program flow is terminated (step $S_{52}$). If, the time interval of the absence of the reference position signal has exceeded a time period of $K_{2m} \times$ (clock period), then the set up ignition angle $\theta_{IG}$ is restored to the initial value $\theta_{IGo}$ and $K_2$ is set to zero while a cancel flag for disregarding this $\theta_{px}$ data is added to this $\theta_{px}$ data (step $S_{53}$). When the presence of the reference position signal is detected, $K_2$ is set to zero (step $S_{54}$).

This subroutine program is effective for determining the stoppage of the engine operation and for preparing the next engine start.

Figure 14:
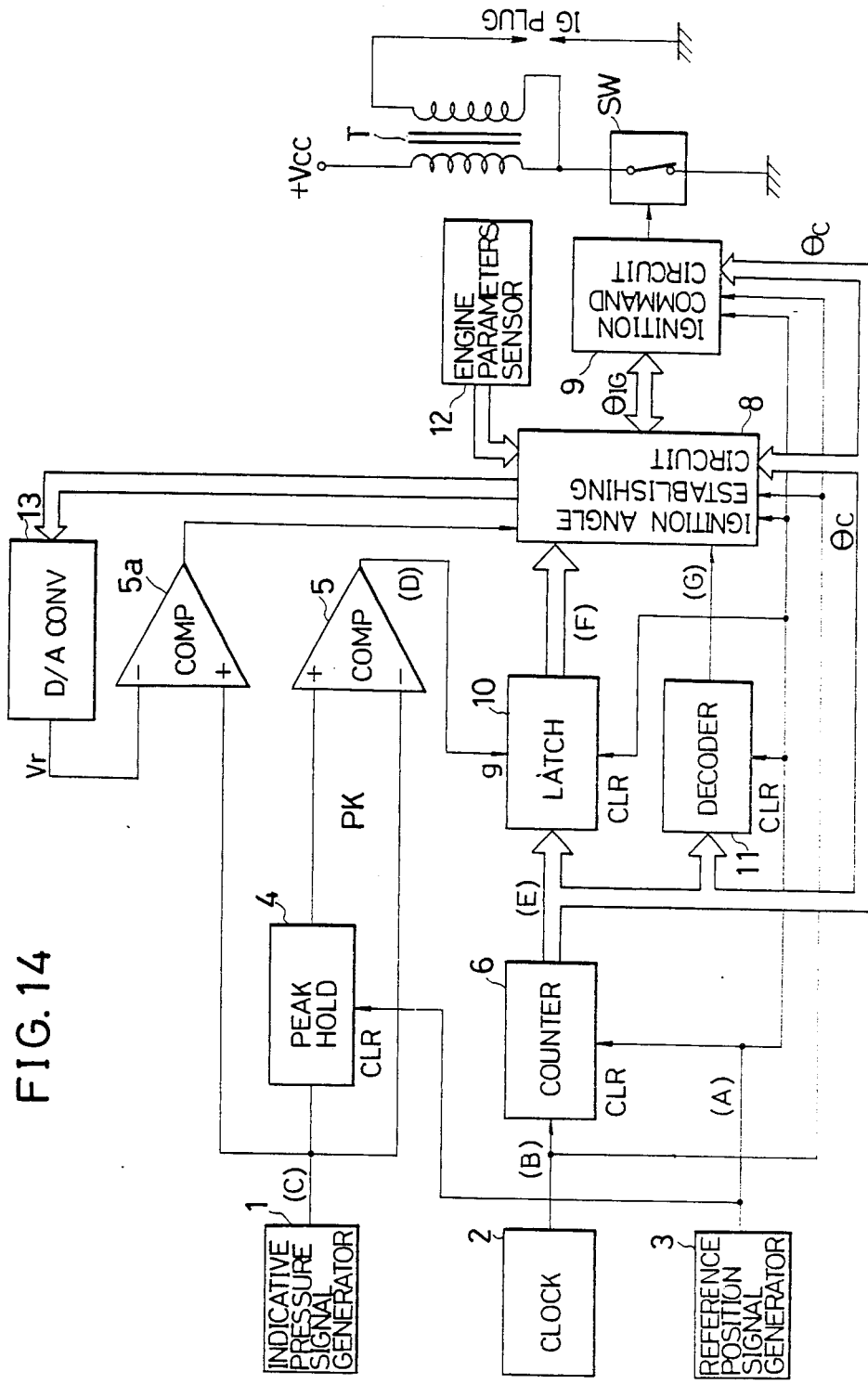
FIG. 14 is a block diagram showing another ignition timing control system according to the present invention.

In FIG. 14, there is shown another ignition timing control system according to the present invention, which has the same construction as that of FIG. 2, except that it includes an additional comparator circuit 5a and a D/A converter 13. The additional comparator circuit 5a receives the indicative pressure signal at its positive input terminal and a reference voltage $V_r$ produced from the D/A converter 13 at its negative input terminal. The comparator circuit 5a produces a reference level clearance signal when the indicative pressure signal exceeds in level the reference voltage Ref, which reference level clearance signal is applied to the ignition angle establishing circuit 8. In this embodiment, the reference position signal generator 3 is adapted to produce the reference position signal at a BTDC position such as BTDC 90°. Furthermore, the count value of the counter 6 representing the actual crank angle $\theta_c$ is supplied not only to the ignition angle but also to the ignition command circuit 9.

Figure 15:
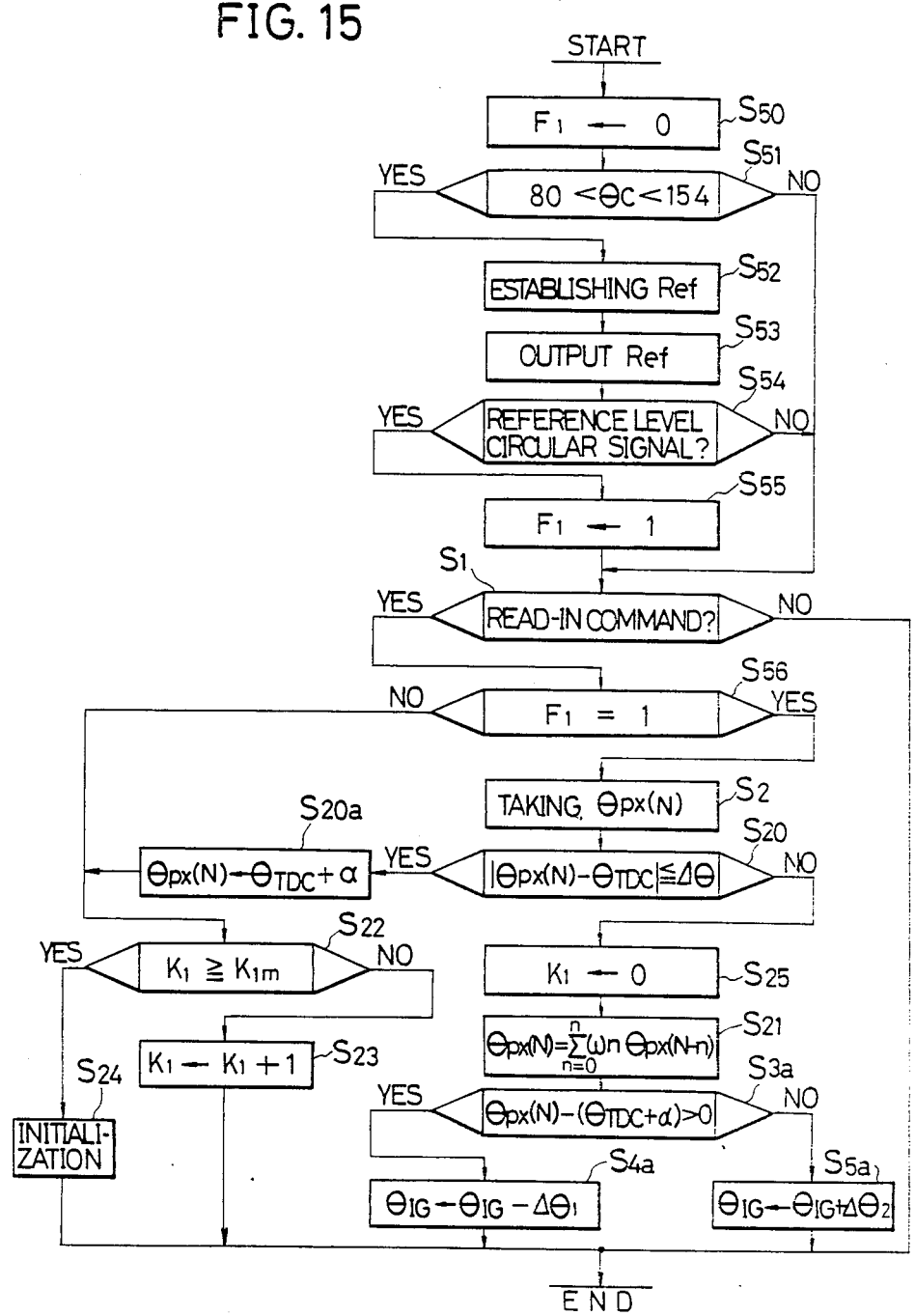
FIG. 15 is a flowchart showing a program to be executed by a part of the system shown in FIG. 14, which is modified from that of FIG. 7.

FIG. 15 shows a program to be executed by the ignition angle establishing circuit 8, which is the same as that of FIG. 7 except that it includes steps $S_{50}$ through $S_{56}$.

In the step $S_{50}$, a flag $F_1$ is initialized to be "0". In the step $S_{51}$, it is determined whether or not the count value $\theta_c$ falls within a range between 80 to 154 which corresponds to a crank angle region of from BTDC 80° to ATDC 64° in which the maximum peak of the indicative signal is expected to occur. When the count value $\theta_c$ is out of the particular range, the program is jumped to the step $S_1$. When the count value $\theta_c$ falls within the particular region, then a reference value Ref is established in accordance with one or more of the engine parameters such as the engine rotational speed Ne and the throttle opening $\theta_{TH}$ in the step $S_{52}$. The reference value Ref may be picked up from a predetermined data map stored in a memory such as ROM (not shown). The reference value Ref is emitted from the ignition angle establishing circuit as a digital datum in the step $S_{54}$ and supplied to the D/A converter 13 which produces the reference voltage Vr. In the step $S_{55}$, it is determined whether or not the reference level clearance signal exists. When the reference level clearance signal exists the flag $F_1$ is set to "1" at the step $S_{55}$. When the reference level clearance signal does not exists the sequence advances to the step $S_1$ while the flag $F_1$ being kept at "0".

When the read-in command is detected at the step $S_1$, it is determined whether or not the flag $F_1$ is "1". When the flag is equal to "1", then the peak position datum $\theta_{px}$ is read into a memory such as RAM (not shown) in the step $S_2$ and the succeeding steps are executed in sequence for the calculation of the ignition angle for the next engine cycle. When, however, the flag $F_1$ is "0", the sequence is jumped to the step $S_{22}$ without taking the datum $\theta_{px}$. That is, the datum $\theta_{px}$ is ignored when the maximum peak level has not reached the predetermined level $V_r$ due to misfiring or an unusual or incomplete combustion in the combustion chamber of the engine.

Figure 16:
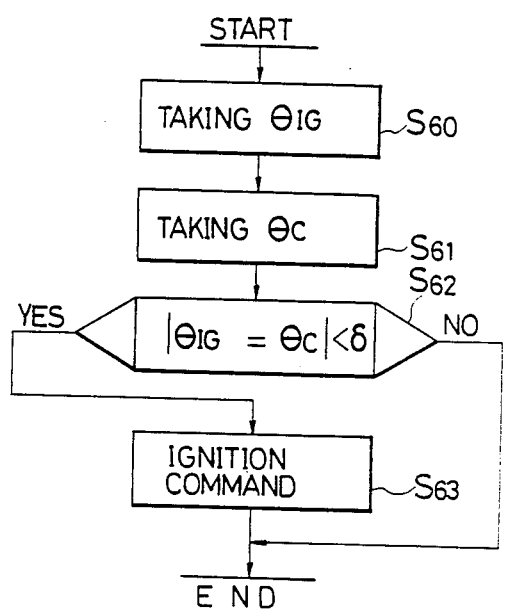
FIG. 16 is a flowchart showing a program to be executed by another part of the system shown in FIG. 14, which is modified from that of FIG. 6.

In FIG. 16, there is shown a program to be executed by the ignition command circuit 9 which is basically the same as that of FIG. 6. In a step $S_{60}$, the established ignition angle datum $\theta IG$ is read. Thereafter, the current crank angle datum $\theta_c$ is read into the memory in a step $S_{61}$. Then, both data are compared with each other in a step $S_{62}$. When the difference between both data $\theta_{IG}$ and $\theta_c$ is smaller than a small values $\delta$, then the ignition command is produced in a step $S_{62}$ and supplied to the ignition system. As long as the difference between both data $\theta_{IG}$ and $\theta_c$ is larger than the small value $\delta$ the sequence is repeated without emitting any ignition command.

Figure 17:
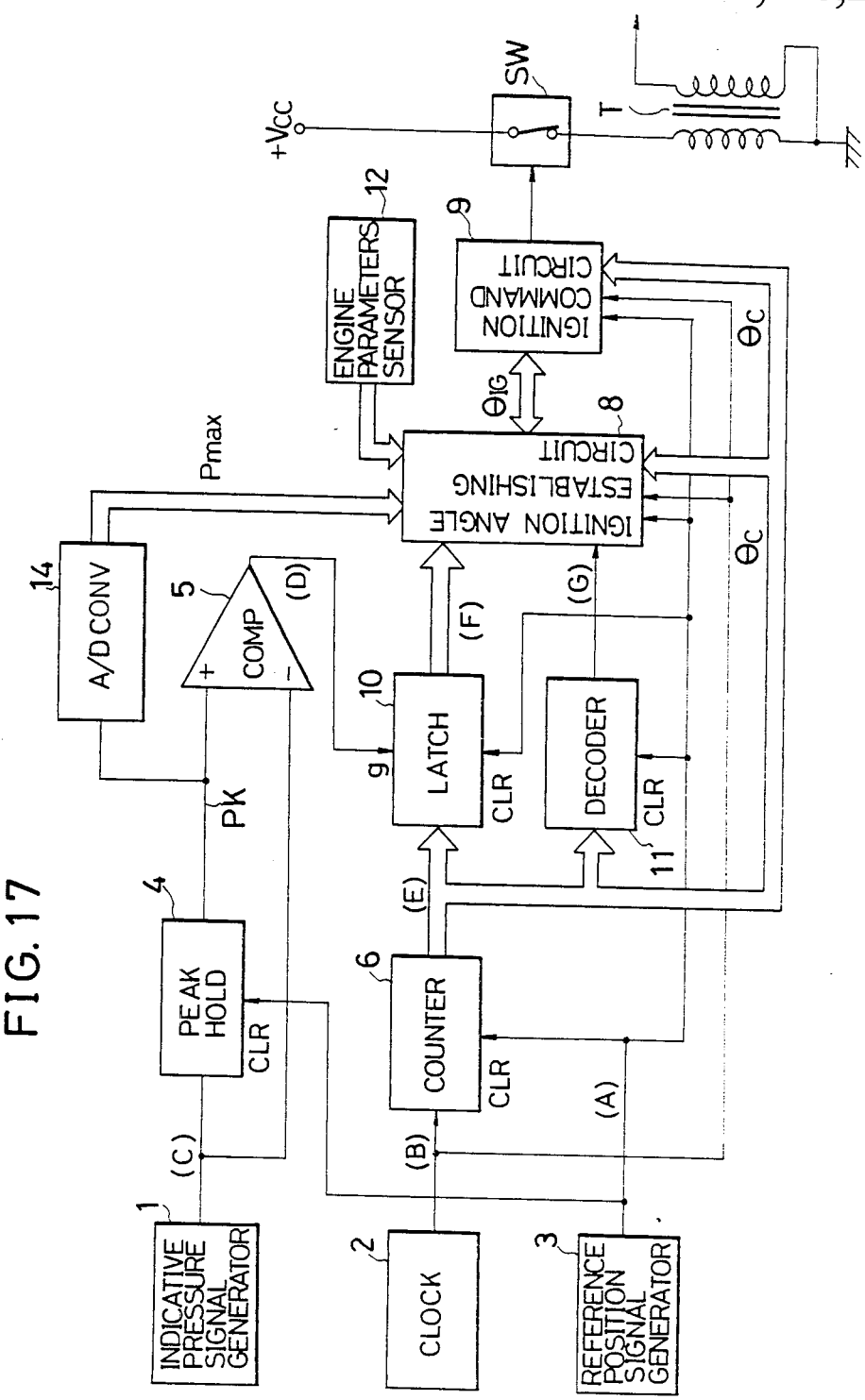
FIG. 17 is a block diagram showing still another embodiment according to the present invention.

In FIG. 17, there is shown another ignition timing control system according to the present invention which has the same construction as that of FIG. 14 except that this system includes an A/D converter 14 in substitution for the additional comparator circuit 5a and the D/A converter 13. The A/D converter 14 converts the output voltage of the peak hold circuit 4 into a digital peak datum Pmax and supplies it to the ignition angle estabishing circuit 8.

Figure 18:
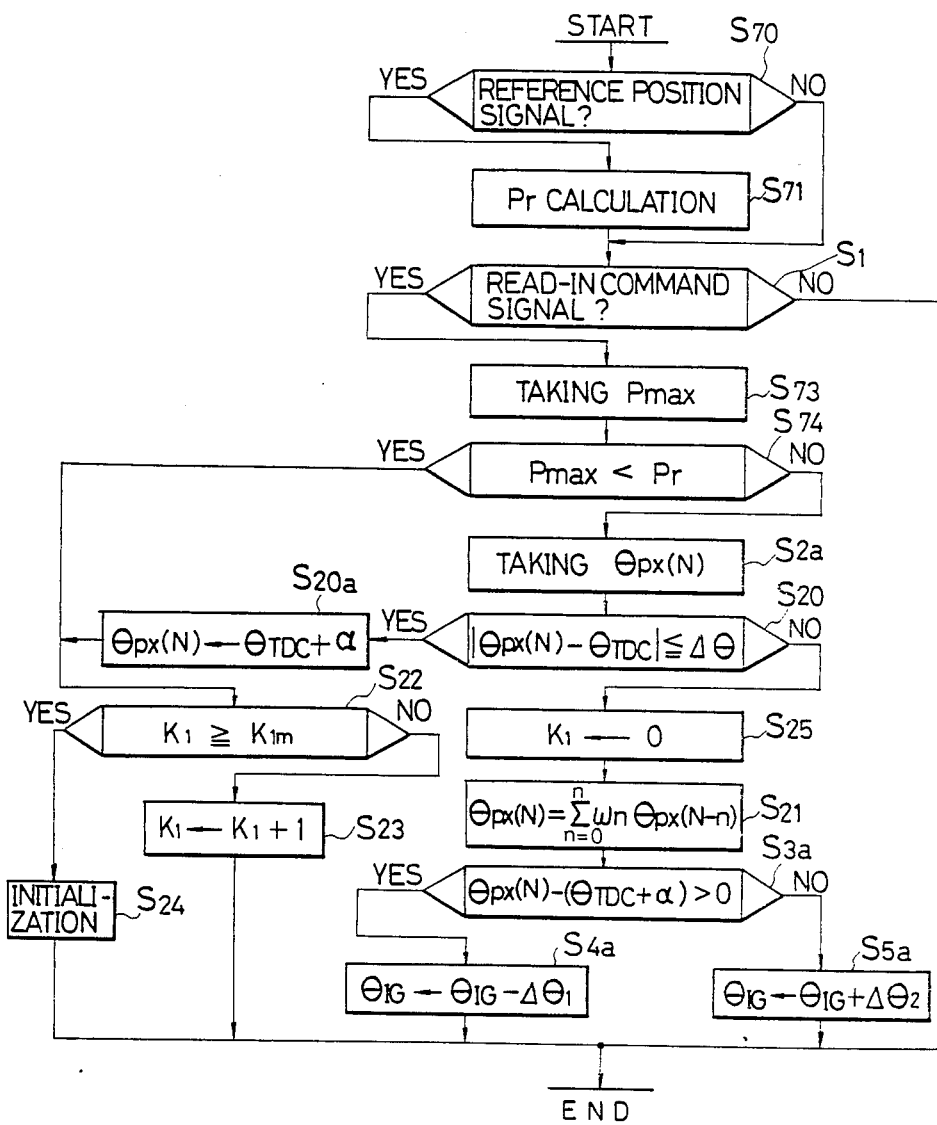
FIG. 18 is a flowchart showing a program to be executed by a part of the system shown in FIG. 17, which is modified from that of FIG. 16.

FIG. 18 shows a program to be executed by the ignition angle establishing circuit 8 of FIG. 17. This program is the same as that of FIG. 7 except that this program includes steps $S_{70}$ through $S_{74}$ for determining whether the datum Pmax exceeds a predetermined reference peak level Pr which is a function of one or more of the engine parameters such as the engine rotational speed and the throttle opening.

According to the program, the ignition angle establishing circuit 8 first detects the reference position signal in the step $S_{70}$. Upon detection of the reference position signal, the ignition angle establishing circuit 8 establishes the reference peak level Pr in accordance with one or more of the engine parameters received from the engine parameters sensing means 12, in the step $S_{71}$. Upon the detection of the read-in command signal at the step $S_1$, the ignition angle establishing circuit 8 reads in the peak datum Pmax from the A/D converter 14 at the step $S_{73}$. When the ignition angle establishing circuit 8 determines that the datum Pmax is larger than the reference peak level datum $P_r$ then it performs the succeeding steps $S_{2a}$ through $S_{5a}$ of determining the desired ignition angle in accordance with the maximum peak position datum $\theta_{px}$. When the datum Pmax is smaller than the reference peak level $P_r$ then the ignition angle establishing circuit 8 ignores the present time $\theta_{px}$ by jumping to the step $S_{22}$.

The ignition angle establishing system of FIG. 17 including the circuit 8 functioning according to the above-mentioned program accomplishes substantially the same effect as that obtained by the system of FIG. 14. Namely, those systems can avoid unfavourable operation even in the face of unusual or incomplete combustion of the engine such as misfiring.

Figure 19:
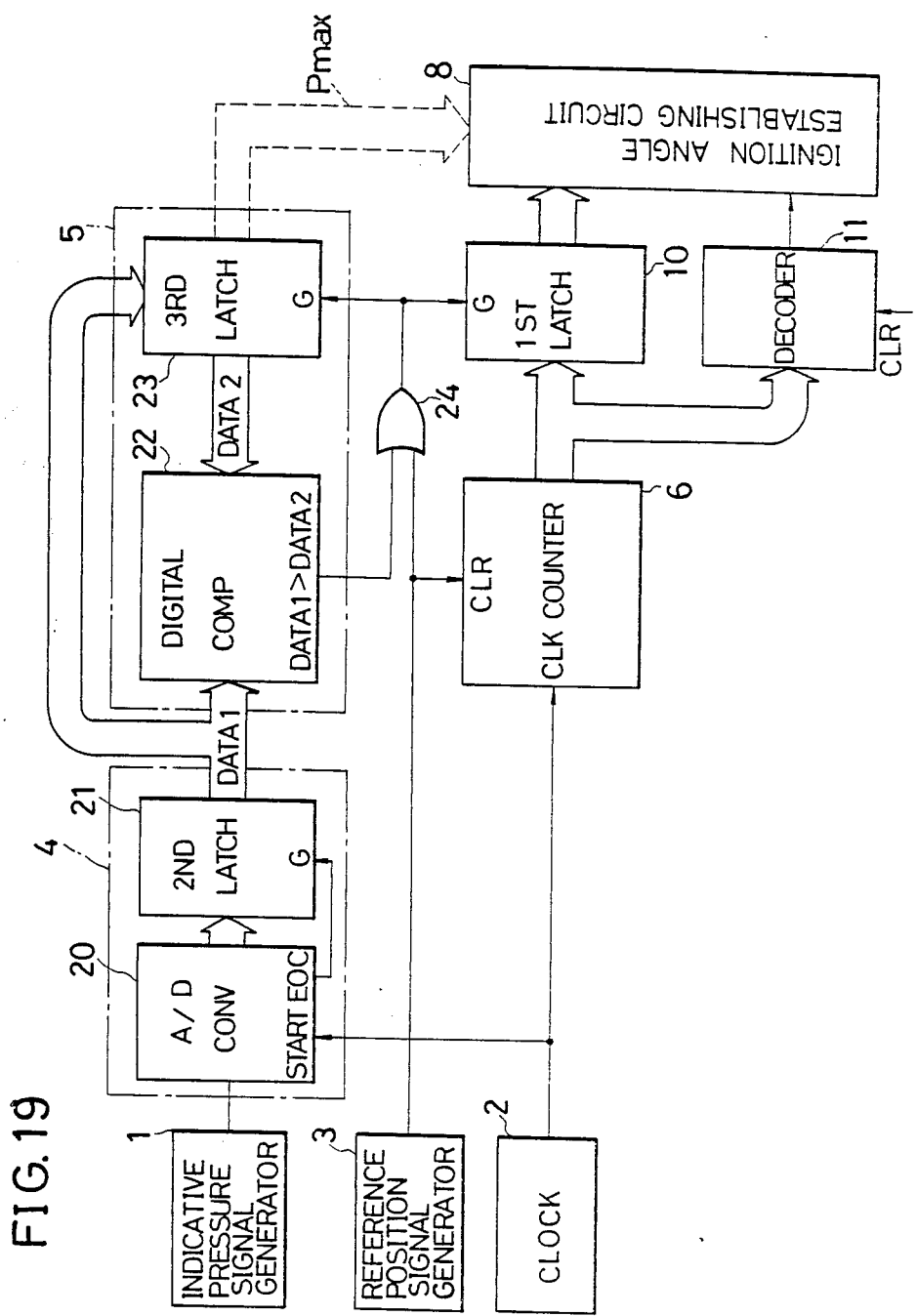
FIG. 19 is a block diagram showing a further embodiment according to the present invention.

In FIG. 19, there is shown another ignition timing control system according to the present invention which has the same basic construction as that of FIG. 17 except that the peak hold circuit 4, and the comparator 5 are respectively formed by digital circuits. The comparator 4 includes an A/D converter for converting the indicative pressure signal into a digital pressure indicative pressure signal and a second latch circuit 21 for latching the digital indicative pressure signal. The comparator 5 includes a third latch circuit 23 for latching the output datum of the second latch circuit 21 and a digital comparator 22 for producing a logic "1" signal when the latch content of the latch circuit 21 exceeds that of the latch circuit 23. The logic "1" signal should be the peak detection signal and supplied through an OR gate 24 to the gate input terminals of the third latch circuit 23 and a first latch circuit 10 corresponding to the latch circuit 10 of the previous system.

In this digital system, the peak level datum Pmax can be readily obtained from the third latch circuit 23.

In the above description, each of the ignition timing control systems has been explained with reference to a single ignition system for a single cylinder. When it is intended to use the above-mentioned control systems for a multicylinder engine, a plurality of control systems can be used each of which is allocated to each cylinder. It was however revealed that the number of the indicative pressure sensors, which are costly, can be reduced by a special arrangement according to the present invention.

Figure 20:
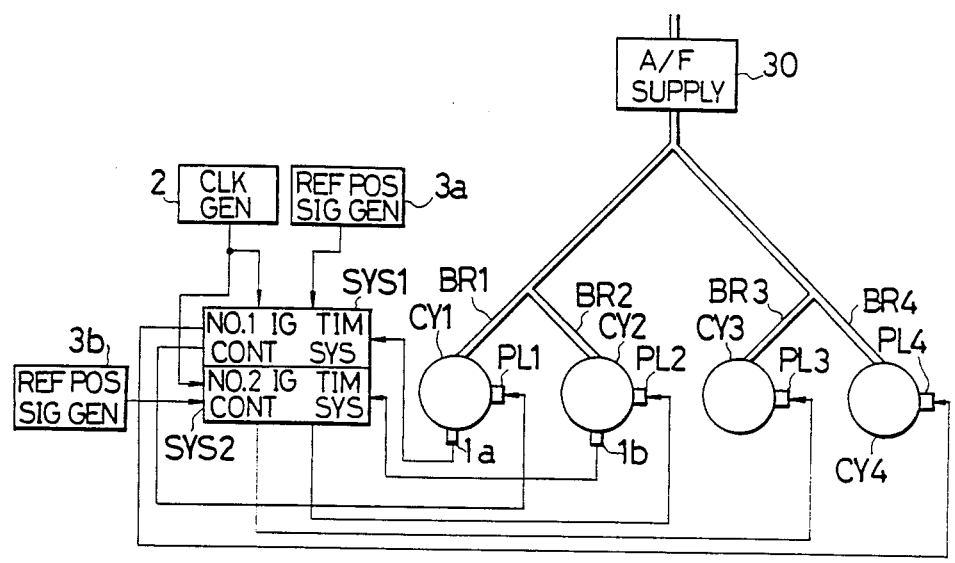
FIGS. 20 and 22 through 24 are diagrams illustrating a ignition timing control system for performing the ignition timing control for a multi cylinder engine.

In FIG. 20, there is shown an arrangement for the ignition timing control for a multi-cylinder engine having four cylinders CY1, CY2, CY3 and CY4 with ignition plugs PL1, PL2, PL3 and PL4. Air-fuel mixture produced from an air-fuel mixture supply means 30 is distributed through four intake manifold branches BR1, BR2, BR3 and BR4 to the respective cylinders CY1, CY2, CY3 and CY4.

It is, in this instance, to be noted that the actual A/F ratios of the respective bulks of air-fuel mixture supplied to the respective cylinders are not usually equal to each other because of possible differences of the passages in various points such as length, cross-section and curvature from the A/D supply means 30 to the respective cylinders CY1, CY2, CY3 and CY 4. On the other hand, it can be said that the peak position $\theta_{px}$ varies mainly dependently upon the A/F ratio in the combustion chamber. Therefore the ignition timings for two cylinders with the same A/F ratios are to be the same as each other.

It can be said that the respective intake passageways for the respective cylinders have generally the same properties when the volumetric or charging efficiencies of the cylinders are generally the same as each other.

Figure 21A:
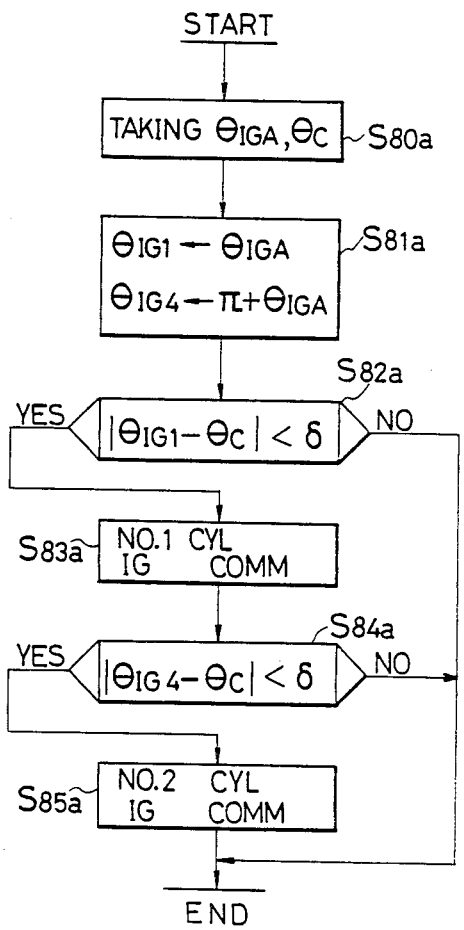
FIGS. 21A and 21B are flowcharts respectively showing a program to be executed by parts of the ignition control system shown in FIG. 20.
Figure 21B:
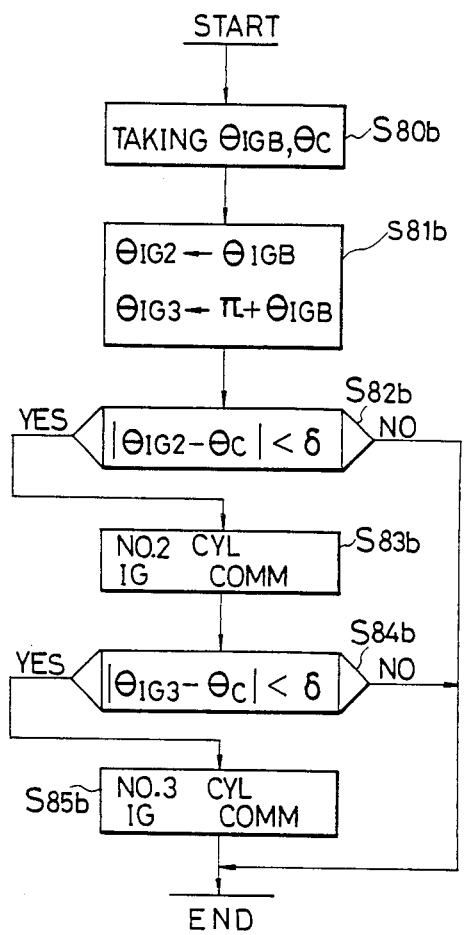
Figure 23:
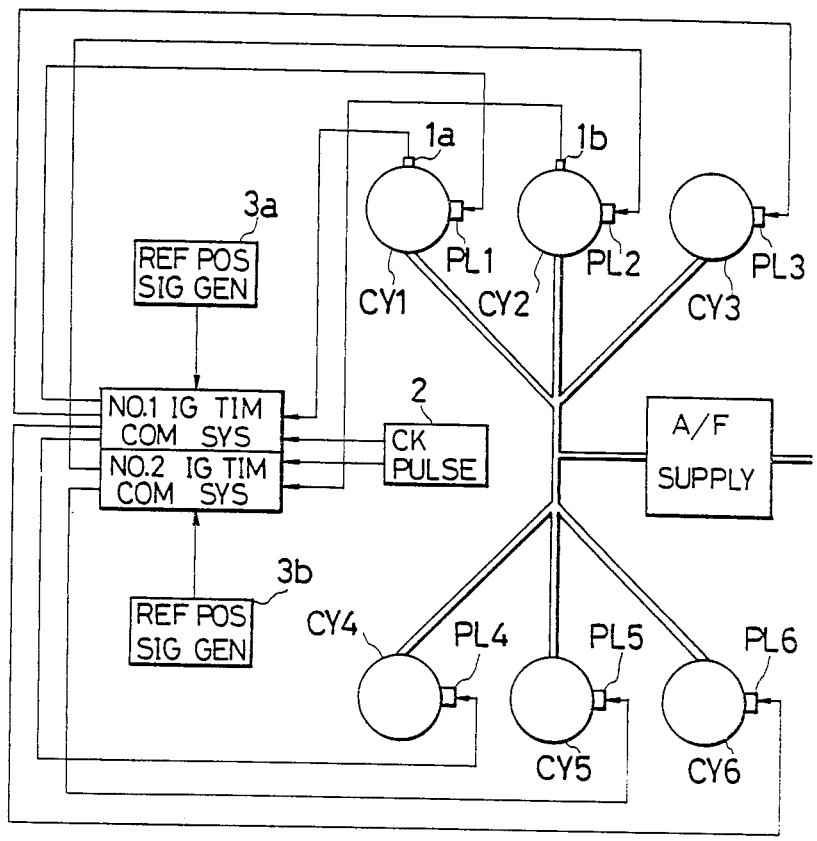

In the case of four-cylinder engine having such arrangement of the intake branches as shown in FIG. 20, it was revealed that the actual A/F ratios of the mixture bulks supplied to two cylinders placed at symmetric positions such as CY1 and CY4, and CY2 and CY3, respectively, are equal to each other because of generally the same properties of the intake passageways communicating with the symmetrically placed cylinders. In the present embodiment, two inner pressure sensors 1a and 1b mounted on the cylinders CY1 and CY2, respectively, which sensors respectively produce two indicative pressure signals. The two indicative pressure signals are respectively supplied to two ignition timing control system SYS1 and SYS2 both having the same constructions as that of either one of those shown in FIGS. 2, 14 and 17, except that the ignition command circuits 9 should execute programs for alternately triggering two ignition systems respectively assigned thereto. Examples of such programs are shown in FIGS. 21A and 21B. The program of FIG. 21A should be executed by the circuit 9 of the system SYS1 and the program of FIG. 21B should be executed by the circuit 9 of the system SYS2. The system SYS1 alternately triggers the plugs PL1 and PL4 and, on the other hand, the system SYS2 alternately triggers the plugs PL2 and PL3. Although the clock signal generator 2 can be used for the both systems SYS1 and SYS2, two reference position pulse generators 3a and 3b are provided for the respective systems SYS1 and SYS2. The reference position pulse generators 3a and 3b can be constituted by single disc rotating in synchronism with the crank shaft of the engine and having a reference position slot, and two photo-couplers aligned to the reference position slot but placed two different angular positions respectively corresponding to the TDC or BTDC reference positions for the respective cylinders CY1 and CY2.

In operation, the respective systems SYS1 and SYS2 concurrently calculate the desired ignition angles $\theta_{IGA}$ and $\theta_{IGB}$ for the respective cylinders CY1, CY4 and CY2, CY3 on the basis of the respective indicative pressure signals and the respective reference position signals supplied thereto. The ignition command circuit 9 of the system SYS1 first takes the data $\theta_{IGA}$ and $\theta_c$ at a step $S_{80a}$. Then, the respective ignition angles $\theta_{IG1}$ and $\theta_{IG4}$ for the cylinders CY1 and CY4 are obtained at a step $S_{81a}$. The thus obtained ignition angle is compared with the crank angle $\theta_c$ at a step $S_{82a}$. When a difference between the angles $\theta_{IG1}$ and $\theta_c$ is smaller than a small predetermined value $\delta$ an ignition command is supplied to the ignition system for the No. 1 cylinder CY1 ($S_{83a}$). When, thereafter, a difference between the angles $\theta_{IG4}$ and $\theta_c$ lowers below the small value $\delta$, an ignition command is supplied to the ignition system corresponding to the No. 4 cylinder CY4 (steps $S_{84a}$, $S_{85a}$).

The ignition command circuit 9 of the other system SYS2 operates in accordance with the program of FIG. 21B in substantially the same manner as that of the system SYS1, except that the system SYS2 triggers the ignition systems for the No. 2 and No. 3 cylinders CY2 and CY3.

Figure 22:
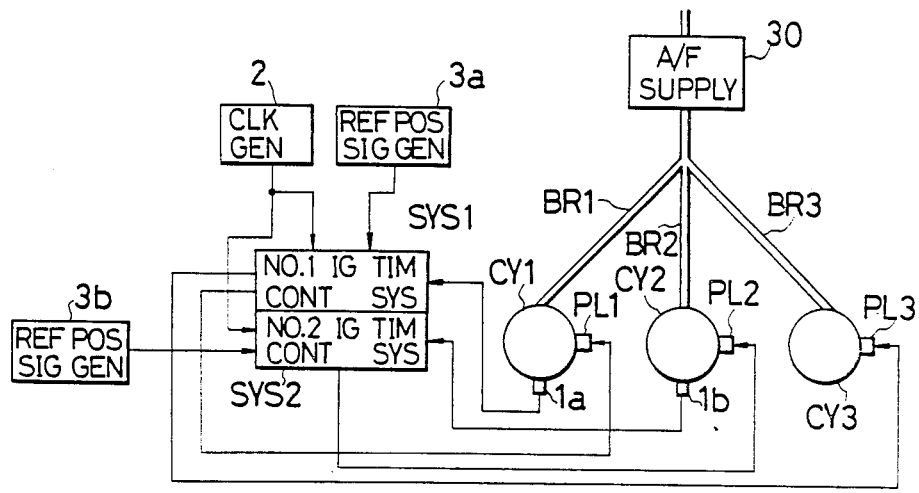

In FIG. 22, there is shown another intake system arrangement for a three-cylinder engine. In this arrangement, No. 1 and No. 3 cylinders CY1 and CY3 are placed symmetrically to each other and, therefore, the indicative pressure signal from a pressure sensor 1a mounted on the No. 1 cylinder CY1 can be used for the ignition timing control for the No. 3 cylinder CY3. Thus, two ignition timing control systems SYS1 and SYS2 of the same constructions are provided for the ignition timing control for the No. 1 and No. 3 cylinders CY1 and CY3, and No. 2 cylinder CY2. It is apparent that the system SYS2 is substantially the same as either one of those of FIGS. 2, 14 and 17 with programs shown in figures other than FIGS. 21A and 21B. The system SYS1 has the same function as that of the system SYS1 explained with reference FIG. 21A except that the ignition angle $\theta_{IG3}$ may be equal to $\theta_{IGA}+2\pi/3$.

Figure 24:
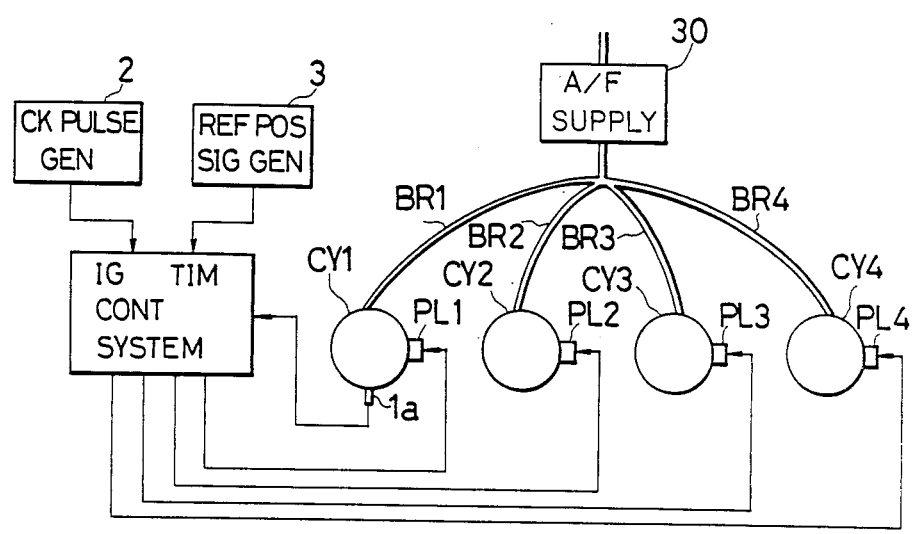

In FIG. 24, there is shown another intake system arrangement for a six-cylinder engine. In this arrangement, Nos. 1, 3, 4 and 6 cylinders CY1, CY3, CY4 and CY6 are subjected to the A/F mixture bulks having the same A/F ratios and the Nos. 2 and 5 cylinders CY2 and CY5 are subjected to the A/D mixture bulks having the same A/F ratios.

Therefore, the two ignition timing control systems SYS1 and SYS2 are assigned to the first group of cylinders CY1, CY3, CY4 and CY6 and the second group of cylinders CY2 and CY5. The systems SYS1 and SYS2 determine the desired ignition angle in response to the respective two indicative pressure signals from the pressure sensors respectively mounted on the cylinders CY1 and CY2. In the system SYS1, the desired ignition timing for the respective cylinders CY1, CY3, CY4 and CY6 may be determined to be equal to $\theta_{IGA}$, $\theta_{IGA}+2\pi/3$, $\theta_{IGA}+\pi$ and $\theta_{IGA}+5\pi/3$. In the system SYS2, the desired ignition timing may be determined to be equal to $\theta_{IGB}$ and $\theta_{IGB}+\pi$.

In FIG. 24, there is shown another intake system arrangement for a four-cylinder engine. In this arrangement, the respective branches BR1 through BR4 are formed to have the same effect upon the increase of the A/F ratio since the charging efficiencies of all the cylinders are generally the same as each other by making the passages formed by the branches to have substantially the same shape in the length, the total cross-sectional area and the total curvature, and so on. In this case, the indicative pressure signal obtained from a pressure sensor 1a mounted on the cylinder CY1 can be a basis for determining all the ignition angles for the respective cylinders, since the A/F ratios of the mixture bulks supplied to the respective cylinders are the same as each other. Therefore a single ignition timing control system SYS is sufficient for regulating the respective ignition timings for the four cylinders. Of course, the respective ignition angles $\theta_{IG1}$, $\theta_{IG2}$, $\theta_{IG3}$, and $\theta_{IG4}$ may be $\theta_{IG}$, $\theta_{IG}+\pi/2$, $\theta_{IG}+\pi$ and $\theta_{IGA}+3\pi/2$.

What is claimed is:
1. An ignition timing control system for an internal combustion engine, comprising:
reference signal generating means for generating a reference position pulse every time the rotational angle position of said internal combustion engine reaches a reference crank angle position;
indicative pressure signal generating means for generating an indicative pressure signal which is representative of the inner pressure in the combustion chamber of said engine;
peak position detecting means for detecting the crank angle position at which the maximum peak of said indicative pressure signal occurs during an engine cycle defined by the consecutive ones of said reference position pulses so as to produce an indicative pressure peak crank angle position signal representing the crank angle position of said engine at which maximum combustion chamber pressure occurs;

ignition angle establishing means for establishing an ignition angle at which said engine is to be ignited within the next engine cycle, in accordance with said indicative pressure peak crank angle position signal; and ignition command means for triggering the ignition system of the engine in response to said ignition angle, in which said ignition angle establishing means includes, peak detecting means of producing a peak signal when the peak level appears in said indicative pressure signal, count means for producing a count value representative of a time period lapsed from each of said reference position pulses, latch means for holding said count value at the issuance of said peak signal, read-in command signal generating means for generating a read-in command signal when said count value reaches a reference value, accepting means for accepting the held count value of said latch means as said maximum peak crank angle position datum in response to said read-in command signal, misfire detecting means for producing a misfire detection signal in accordance with a deviation of the maximum peak crank angle position represented by said maximum peak crank angle position datum from the TDC position, and determining means for determining said ignition angle in accordance with said maximum peak position crank angle data while neglecting the maximum peak position crank angle datum obtained during an engine cycle in which said misfire detection signal appears.

2. An ignition timing control system according to claim 1, wherein said misfire detecting means includes comparing means for comparing the accepted maximum peak position crank angle datum with the crank angle corresponding to top dead center of the cylinder so as to produce said misfire detection signal when a difference in crank angle between the accepted maximum peak position crank angle datum and the TDC position is smaller than a predetermined value.

3. An ignition timing control system according to claim 1, wherein said misfire detecting means includes reference level establishing means of establishing a reference level in accordance with the engine conditions; and comparing means of comparing the maximum peak level of said indicative pressure signal during an engine cycle with said reference level so as to produce said misfire detection signal when the maximum peak level is lower than said reference level.

4. An ignition timing control system according to claim 3, wherein said peak position detecting means includes peak holding means for holding a maximum peak level consecutively appearing in said indicative pressure signal; and a comparator of producing said peak signal when the held maximum peak level of said indicative pressure signal lowers in level, said comparing means of said misfire detecting means being adapted to compare the maximum peak level held in said peak holds with said reference level.

5. An ignition timing control system for an internal combustion engine, comprising:

reference signal generating means for generating a reference position pulse every time the rotational angle position of said internal combustion engine reaches a reference crank angle position;

indicative pressure signal generating means for generating an indicative pressure signal which is representative of the inner pressure in the combustion chamber of said engine;

peak position detecting means for detecting the crank angle position at which the maximum peak of said indicative pressure signal occurs during an engine cycle defined by the consecutive ones of said reference position pulses so as to produce an indicative pressure peak crank angle position signal representing the crank angle position of said engine at which maximum combustion chamber pressure occurs;

ignition angle establishing means for establishing an ignition angle at which said engine is to be ignited within the next engine cycle, in accordance with said indicative pressure peak crank angle position signal; and ignition command means for triggering the ignition system of the engine in response to said ignition angle, in which said ignition angle establishing means includes, peak detecting means for producing a peak signal when the peak level appears in said indicative pressure signal, count means for producing a count value representative of a time period lapsed from each of said reference position pulses, latch means of holding said count value at the issuance of said peak signal, read-in command signal generating means for generating a read-in command signal when said count value reaches a reference value, accepting means for accepting the held count value of said latch means as said maximum peak crank angle position datum in response to said read-in command signal, misfire detecting means for producing a misfire detection signal when incomplete combustion takes place in an engine cycle, and determining means for determining said ignition angle by retarding the ignition angle by a predetermined angle in response to said misfire detection signal.

6. An ignition timing control system for an internal combustion engine comprising:

reference signal generating means for generating a reference position pulse every time the rotational angle position of said internal combustion engine reaches a reference crank angle position;

indicative pressure signal generating means for generating an indicative pressure signal which is representative of the inner pressure in the combustion chamber of said engine;

peak position detecting means for detecting the crank angle position at which the maximum peak of said indicative pressure signal occurs during an engine cycle defined by the consecutive ones of said reference position pulses so as to produce an indicative pressure peak crank angle position signal representing the crank angle position of said engine at which maximum combustion chamber pressure occurs;

ignition angle establishing means for establishing an ignition angle at which said engine is to be ignited within the next engine cycle, in accordance with said indicative pressure peak crank angle position signal; and ignition command means for triggering the ignition system of the engine in response to said ignition angle, wherein said ignition angle establishing means includes, peak detecting means for producing a peak signal when the peak level appears in said indicative pressure signal, count means for producing a count value representative of a time period lapsed from each of said reference position pulses, latch means for holding said count value at the issuance of said peak signal, read-in command signal generating means for generating a read-in command signal when said count value reaches a reference value, accepting means for accepting the held count value of said latch means as said maximum peak crank angle position datum in response to said read-in command signal, misfire detecting means for producing a misfire detection signal when incomplete combustion takes place in an engine cycle, determining means for determining said ignition angle in accordance with said maximum peak position crank angle data while neglecting the maximum peak position crank angle datum obtained during an engine cycle in which said misfire detection signal appears, and initializing means for initializing said accepting means when said misfire detection signal appears at each cycle of a predetermined number of consecutive engine cycles.

* * * * *